൫(12)൯ United States Patent
Hosoki et al.

(10) Patent No.: US 8,090,921 B2
(45) Date of Patent: Jan. 3, 2012

(54) PROCESSING DEVICE, COMPUTER SYSTEM, AND MOBILE APPARATUS

(75) Inventors: Tetsu Hosoki, Osaka (JP); Masaitsu Nakajima, Osaka (JP)

(73) Assignee: Panasonic Corporation, Osaka (JP)

( * ) Notice: Subject to any disclaimer, the term of this patent is extended or adjusted under 35 U.S.C. 154(b) by 783 days.

(21) Appl. No.: 11/850,761

(22) Filed: Sep. 6, 2007

(65) Prior Publication Data

US 2008/0065833 A1 Mar. 13, 2008

(30) Foreign Application Priority Data

Sep. 11, 2006 (JP) ................................. 2006-246000
May 18, 2007 (JP) ................................. 2007-133208

(51) Int. Cl.
*G06F 12/00* (2006.01)
(52) U.S. Cl. .......... 711/170; 711/130; 711/154; 710/74; 710/305; 712/35
(58) Field of Classification Search .............. 710/62–74, 710/305–315; 711/128–131, 135, 141, 147, 711/149, 153, 154, 170; 712/10–22, 34, 712/35
See application file for complete search history.

(56) References Cited

U.S. PATENT DOCUMENTS

| 5,247,649 | A | * | 9/1993 | Bandoh | 711/130 |
| 5,875,464 | A | | 2/1999 | Kirk | |
| 6,725,336 | B2 | * | 4/2004 | Cherabuddi | 711/129 |
| 2004/0193929 | A1 | | 9/2004 | Kuranuki | |
| 2005/0268041 | A1 | * | 12/2005 | Yoshioka | 711/128 |
| 2007/0143789 | A1 | | 6/2007 | Shiomi et al. | |
| 2007/0226399 | A1 | | 9/2007 | So et al. | |
| 2008/0022288 | A1 | * | 1/2008 | Bekooij | 718/107 |

FOREIGN PATENT DOCUMENTS

| EP | 0340668 | 11/1989 |
| JP | 280860 | 11/1989 |

OTHER PUBLICATIONS

English language Abstract of JP 1-280860.

* cited by examiner

*Primary Examiner* — Matthew Bradley
(74) *Attorney, Agent, or Firm* — Greenblum & Bernstein, P.L.C.

(57) ABSTRACT

A processing device included on a single chip includes processors capable of executing tasks in parallel and a cache memory shared by the processors, wherein the cache memory includes single-port memories and read data selection units, each of the single-port memories have one data output port, and each of the read data selection units is in a one-to-one association with each of the processors and selects a single-port memory which stores data to be read to a associated processor, from among the single-port memories.

14 Claims, 19 Drawing Sheets

| Task ID | Way 1 | Way 2 | Way 3 | Way 4 | ... | Way n |
|---|---|---|---|---|---|---|
| 0 | enable | disable | disable | disable | ... | disable |
| 1 | disable | enable | disable | disable | ... | disable |
| 2 | disable | disable | enable | disable | ... | disable |
| : | | | | | | |
| m | disable | disable | disable | disable | ... | enable |

| Task ID | Way 1 | Way 2 | Way 3 | Way 4 | ... | Way n | Executing processor |
|---|---|---|---|---|---|---|---|
| 0 | enable | enable | disable | disable | ... | disable | Processor 102-1 |
| 1 | enable | enable | disable | disable | ... | disable | Processor 102-1 |
| 2 | disable | disable | enable | enable | ... | enable | Processor 102-2 |
| .. | | | | | | | .. |
| m | disable | disable | enable | enable | ... | enable | Processor 102-2 |

| Task ID | Way 1 | Way 2 | Way 3 | Way 4 | ... | Way n | Executing processor |
|---------|-------|-------|-------|-------|-----|-------|---------------------|
| 0 | enable | disable | disable | disable | ... | disable | Processor 102-1 |
| 1 | enable | disable | disable | disable | ... | disable | Processor 102-1 |
| 2 | disable | enable | disable | disable | ... | disable | Processor 102-2 |
| 3 | disable | disable | enable | enable | ... | disable | Processor 102-2 |
| 4 | disable | disable | enable | enable | ... | disable | Processor 102-2 |
| .. | | | | | ... | | .. |
| m | disable | disable | disable | disable | ... | enable | Processor 102-2 |

PROCESSING DEVICE, COMPUTER SYSTEM, AND MOBILE APPARATUS

BACKGROUND OF THE INVENTION (1) Field of the Invention

The present invention relates to a processing device in which processors are included on a single chip, and in particular, to a processing device in which a cache memory shared by the processors is included.

(2) Description of the Related Art

Technical development in processing devices in which processors are included on a single chip has intensified in recent years. Furthermore, in such a processing device, it is typical that a cache memory is included in processors in order to improve processing performance. Thus, sharing a cache memory among processors becomes important. Accordingly, various techniques for sharing a cache memory among processors have been conventionally proposed (for instance, refer to Japanese Unexamined Patent Application Publication No. 01-280860).

However, in order to have processors share the above-described cache memory, each processor has a data port, and the number of data lines corresponding to the data ports is provided. A data port is a collective designation for an output port through which data is read from a cache memory and an input port through which data is written into a cache memory.

For instance, consider, as an example, a case where a cache memory capable of reading and writing 128-bit data is shared by two processors. In this case, for data lines, at least two sets of signal lines corresponding to the 128 bits are required. Therefore, even with cache memories having the same capacity, there is a problem in that the circuit area of a cache memory having a multi-port data port increases in comparison to that of a cache memory having a single-port dataport. In addition, the number of dataports increases as the number of processors increases. As a result, the above-described problem becomes more prominent as the number of processors increases.

SUMMARY OF THE INVENTION

The object of the present invention is to provide a processing device in which processors and a cache memory shared by the processors are included on a single chip, thereby improving area reduction.

In order to achieve the aforementioned object, the processing device according to the present invention is (a) a processing device which is included on a single chip, and the device includes: (a1) processors capable of executing tasks in parallel; and (a2) a cache memory shared by the processors, (a3) wherein the cache memory includes data storage units and read data selection units, (a3-1) each of the data storage units has one data output port, and (a3-2) each of the read data selection units is in a one-to-one association with each of the processors, and selects a data storage unit which stores data to be read to the associated processor, from among the data storage units.

Accordingly, by configuring the portion connecting a data storage unit and a processor as a simple selection circuit such as the read data selection unit, a processing device having processors can be configured using a smaller amount of hardware. In addition, a data output port of a data storage unit need not be provided for each processor, and can instead be shared by the processors. As a result, a single-port memory having a smaller cell area as compared to a multiport memory can be used as the data storage unit, thereby improving area reduction of the cache memory as well as cost reduction.

Furthermore, it is possible that (b) (b1) each of the data storage units has one memory access request input port and one data input port, (b2) the cache memory includes memory access request selection units, and (b2-1) each of the memory access request selection units is in a one-to-one association with each of the data storage units, and selects a memory access request outputted from the processor which executes a task that is allocated to the associated data storage unit, from among memory access requests individually outputted from the processors.

Accordingly, since simultaneous access from processors to the same data storage unit will no longer occur, a memory access request input port of a data storage unit need not be provided for each processor, and can instead be shared by the processors. In addition, since simultaneous writing of data from processors to the same data storage unit or simultaneous reading of data by the processors from the same data storage unit will no longer occur, a data input port and a data output port of a data storage unit can both be shared by the processors. As a result, a single-port memory having a smaller cell area as compared to a multiport memory can be used as the data storage unit, thereby improving area reduction of the cache memory as well as cost reduction. In addition, since access conflicts to the same data storage unit can be avoided and therefore arbitration due to access conflict is no longer necessary, the improvement of processing performance may be promoted.

Alternatively, it is possible that (c) (c1) each of the data storage units is classified into any one of data storage areas each made up of one or more the data storage units from among the data storage units, and (c2) the cache memory includes: (c2-1) an allocation information holding unit that hold allocation information indicating that a predetermined task has been allocated to a predetermined data storage area from among the data storage areas, in association with the predetermined data storage area; and (c2-2) an identification unit that identify, when a refill occurs for the predetermined task, the predetermined data storage area from among the data storage areas as a refillable data storage area, based on the allocation information held in the allocation information holding unit.

Accordingly, with a refill created due to the execution of a predetermined task, inadvertent rewriting of a data storage unit allocated to another task can be avoided. In addition, since access with respect to the predetermined task is restricted to a predetermined data storage unit, access conflicts to the same data storage unit can be avoided. Furthermore, since simultaneous access from processors to the same data storage unit will no longer occur, a memory access request input port, a data input port and a data output port can respectively be shared by the processors. As a result, a single-port memory having a smaller cell area as compared to a multiport memory can be used as the data storage unit, thereby improving area reduction of the cache memory as well as cost reduction.

Alternatively, it is possible that (d) (d1) the cache memory is an n-way set-associative cache memory, n being a natural number, and (d2) each of the data storage units is in a one-to-one association with each of the n-ways.

Accordingly, management of each data storage unit can be realized in a simple manner using a chip select that exists for each way.

Furthermore, the computer system according to the present invention includes (e) (e1) the aforementioned processing device; and (e2) a main storage device which stores an allocation program, (e3) wherein when the predetermined task is created, the processing device allocates the predetermined data storage area for the predetermined task from among the data storage areas, and registers the allocation information in the allocation information holding unit in association with the predetermined data storage area, the processing device having executed the allocation program.

Accordingly, even when tasks are simultaneously executed by processors, since each task is managed in association with each data storage area, tasks can be executed while avoiding access conflicts to the same data storage unit. In turn, since access conflicts to one or more data storage units making up a data storage area can also be avoided, a memory access request input port, a data input port and a data output port can respectively be shared by the processors. Furthermore, a single-port memory having a smaller cell area as compared to a multiport memory can be used as the data storage unit, thereby improving area reduction of the cache memory as well as cost reduction.

Furthermore, it is possible that (f) the processing device manages allocation of tasks to each of the data storage areas, allocates a different data storage area from among the data storage areas for each task, and registers different allocation information for each task in the allocation information holding unit in association with a different data storage area for each task, the processing device having executed the allocation program.

Accordingly, even when an arbitrary task is executed by an arbitrary processor, since a different data storage unit is allocated for each task, tasks can be executed while avoiding access conflicts to the same data storage unit. In turn, since access conflicts to one or more data storage units making up a data storage area can also be avoided, a memory access request input port, a data input port and a data output port can respectively be shared by processors. Furthermore, a single-port memory having a smaller cell area as compared to a multiport memory can be used as the data storage unit, thereby improving area reduction of the cache memory as well as cost reduction.

Alternatively, it is possible that (g) the processing device classifies each of the data storage areas into any one of cache areas that are respectively in a one-to-one association with each of the processors, to manage allocation of tasks to each of the data storage areas, allocates a data storage area within a predetermined cache area in association with the predetermined processor from among the cache areas, for a task that is executed by the predetermined processor from among the processors, and registers a plurality of allocation information that individually identifies tasks to be executed by the predetermined processor, in the allocation information holding unit in association with the predetermined cache area, the processing device having executed the allocation program.

Accordingly, even when the number of data storage areas classified into a predetermined cache area is smaller than the number of tasks to be executed by a predetermined processor, tasks can be executed while avoiding access conflicts to the same data storage unit. This is due to the fact that accessible data storage areas are limited for each processor and simultaneous access to the same data storage area by processors is prevented. In turn, since access conflicts to one or more data storage units making up a data storage area can also be avoided, a memory access request input port, a data input port and a data output port can respectively be shared by the processors. Furthermore, a single-port memory having a smaller cell area as compared to a multiport memory can be used as the data storage unit, thereby improving area reduction of the cache memory as well as cost reduction.

Furthermore, it is possible that (h) the processing device classifies each of the data storage areas that make up the predetermined cache area into either a first partial cache area made up of data storage areas that are allocatable only to a task or a second partial cache area made up of data storage areas that are allocatable for tasks, and when a task executed by the predetermined processor is a task of a predetermined type, a data storage area is allocated from the first partial cache area, and when a task executed by the predetermined processor is not a task of the predetermined type, a data storage area is allocated from the second partial cache area, the processing device having executed the allocation program.

Accordingly, even when the number of data storage areas classified into a predetermined cache area is smaller than the number of tasks to be executed by a predetermined processor, tasks can be executed while avoiding access conflicts to the same data storage unit. This is due to the fact that accessible data storage areas are limited for each processor and simultaneous access to the same data storage area by processors is prevented. In turn, since access conflicts to one or more data storage units making up a data storage area can also be avoided, a memory access request input port, a data input port and a data output port can respectively be shared by the processors. Furthermore, a single-port memory having a smaller cell area as compared to a multiport memory can be used as the data storage unit, thereby improving area reduction of the cache memory as well as cost reduction.

Moreover, for tasks to be executed by a predetermined processor, according to the tasks, since a different data storage area can be allocated for each task or a data storage area that is shared by the tasks can be allocated, the improvement of processing performance may be promoted while reducing cache misses due to task switching. This may be easily understood from the example provided below.

For instance, assume that the same data storage area is allocated for tasks to be executed by a predetermined processor. In this case, a large number of tasks can be allocated to the predetermined processor. However, a cache miss is likely to occur when switching among these tasks.

On the other hand, assume that different data storage areas are allocated to these tasks. In this case, a large number of tasks can no longer be allocated to the predetermined processor. However, it is now less likely that a cache miss will occur when switching among these tasks.

Furthermore, it is possible that the processors according to the present invention include (i) (i1) a first processor which operates at a first operation speed and a second processor which operates at a second operation speed that is slower than the first operation speed, (i2) the read data selection units include a first read data selection unit that correspond to the first processor and a second read data selection unit that correspond to the second processor, and (i3) the cache memory includes a speed difference adjustment unit that adjust timing at which data outputted from the second read data selection unit is inputted to the second processor, according to a speed difference between the operation speed of the first processor and the operation speed of the second processor.

Furthermore, it is possible that (j) (j1) the first operation speed is k times the second operation speed, k being a natural number, (j2) an operation clock of the cache memory is the same as an operation clock of the first processor, and (j3) the speed difference adjustment unit includes a delay circuit which delays timing at which data outputted from the second read data selection unit is inputted to the second processor, in terms of the operation clock of the cache memory, by k−1 clocks with respect to the timing at which data outputted from the first read data selection unit is inputted to the first processor.

Accordingly, even when a cache memory is shared by processors having different operation speeds, each of the processors is capable of simultaneous access in similar sequences without recognizing the operation speed differences among the processors. In addition, since operation speed differences can be adjusted, a data output port of a data storage unit need not be provided for each processor, and can instead be shared by the processors. As a result, a single-port memory having a smaller cell area as compared to a multiport memory can be used as the data storage unit, thereby improving area reduction of the cache memory as well as cost reduction.

Furthermore, it is possible that (k) (k1) the first processor operates at the first operation speed when an operation mode is a first mode, and operates at the second operation speed when the operation mode is a second mode, and (k2) the speed difference adjustment unit adjusts the timing inputted to the second processor during the first mode, and does not adjust the timing inputted to the second processor during the second mode.

Accordingly, even when a cache memory is shared by processors with different operation speeds, each of the processors is capable of simultaneous access in similar sequences without recognizing the operation speed differences among the processors as well as the switching timing of operation speeds. In addition, since operation speed differences can be adjusted, a data output port of a data storage unit need not be provided for each processor, and can instead be shared by processors. As a result, a single-port memory having a smaller cell area as compared to a multiport memory can be used as the data storage unit, thereby improving area reduction of the cache memory as well as cost reduction.

It should be noted that the present invention may be realized not only as a processing device, but also as a processing device control method for controlling a processing device. In addition, the present invention may be realized as an LSI (Large Scale Integration) embedded with the functions of a processing device, an IP (Intellectual Property) core that configures such functions into a programmable logic device such as an FPGA (Field Programmable Gate Array) or a CPLD (Complex Programmable Logic Device), a recording medium on which the IP core is recorded, or the like. Furthermore, the present invention may be realized as a computer system provided with the processing device, a method for controlling the computer system, a program that causes the processing device to execute the method, a recording medium on which the program is recorded, or the like. Moreover, the present invention may be realized as a mobile apparatus provided with the computer system, a method for controlling the mobile apparatus, a program that causes the mobile apparatus to execute the method, a recording medium on which the program is recorded, or the like.

As seen, according to the processing device of the present invention, access conflicts to the same data storage unit can be avoided. In addition, with a refill created due to the execution of a predetermined task, inadvertent rewriting of a data storage unit allocated to another task can be avoided. Thus, since access with respect to a predetermined task is restricted to a predetermined data storage area, access conflicts to the same data storage unit can be avoided.

Accordingly, a memory access request input port, a data input port and a data output port can respectively be shared by processors. Furthermore, a single-port memory having a smaller cell area as compared to a multiport memory can be used as the data storage unit, thereby improving area reduction of the cache memory as well as cost reduction.

Moreover, by configuring the portions connecting the data storage units and the processors as a simple selection circuit such as the read data selection unit, a processing device having processors can be configured using a smaller amount of hardware.

In addition, since access conflicts to the same data storage unit can be avoided and therefore arbitration due to access conflict is no longer necessary, the improvement of processing performance may be promoted.

Furthermore, management of each data storage unit can be realized in a simple manner using a chip select that exists for each way.

According to a computer system of the present invention, even when tasks are simultaneously executed by processors, since each task is managed in association with each data storage area, tasks can be executed while avoiding access conflicts to the same data storage unit.

In turn, since access conflicts to one or more data storage units making up a data storage area can also be avoided, a memory access request input port, a data input port and a data output port can respectively be shared by processors. Furthermore, a single-port memory having a smaller cell area as compared to a multiport memory can be used as the data storage unit, thereby improving area reduction of the cache memory as well as cost reduction.

Moreover, even when an arbitrary task is executed by an arbitrary processor, since a different data storage area is allocated for each task, tasks can be executed while avoiding access conflicts to the same data storage unit.

In addition, even when the number of data storage areas classified into a predetermined cache area is smaller than the number of tasks to be executed by a predetermined processor, tasks can be executed while avoiding access conflicts to the same data storage unit. This is due to the fact that accessible data storage areas are limited for each processor and simultaneous access to the same data storage area by processors is prevented.

Furthermore, since different data storage areas are allocated for tasks to be executed by a predetermined processor, cache misses due to task switching may be reduced, thereby promoting the improvement of processing performance. For instance, assume that the same data storage area is allocated for tasks to be executed by a predetermined processor. In this case, a large number of tasks can be allocated to the predetermined processor. However, a cache miss is likely to occur when switching among these tasks. On the other hand, assume that different data storage areas are allocated to these tasks. In this case, a large number of tasks can no longer be allocated to the predetermined processor. However, this means that a cache miss is now less likely to occur when switching among these tasks.

As seen, according to the present invention, even when tasks are simultaneously executed by processors, since each task is managed in association with each data storage area in a cache memory, tasks can be executed while avoiding access conflicts to the same data storage unit in the cache memory. As a result, since the tasks can be executed while avoiding access conflicts to the same data storage area, a memory access request input port, a data input port and a data output port can respectively be shared by the processors. In addition, a single-port memory having a smaller cell area as compared to a multiport memory can be used as the data storage unit, thereby improving area reduction of the cache memory as well as cost reduction. Furthermore, in comparison to a case where an access conflict occurs and the arbitration is necessary, the processing performance can be improved.

FURTHER INFORMATION ABOUT TECHNICAL BACKGROUND TO THIS APPLICATION

The disclosures of Japanese Patent Application No. 2006-246000 filed on Sep. 11, 2006 and Japanese Patent Application No. 2007-133208 filed on May 18, 2007 including specification, drawings and claims are incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 is a diagram showing a data structure of a way management table according to the first embodiment of the present invention;

FIG. 8 is a diagram showing a data structure of a way management table according to the second embodiment of the present invention;

FIG. 11 is a diagram showing a data structure of a way management table according to the third embodiment of the present invention;

DESCRIPTION OF THE PREFERRED EMBODIMENT(S)

First Embodiment

Figure 1:
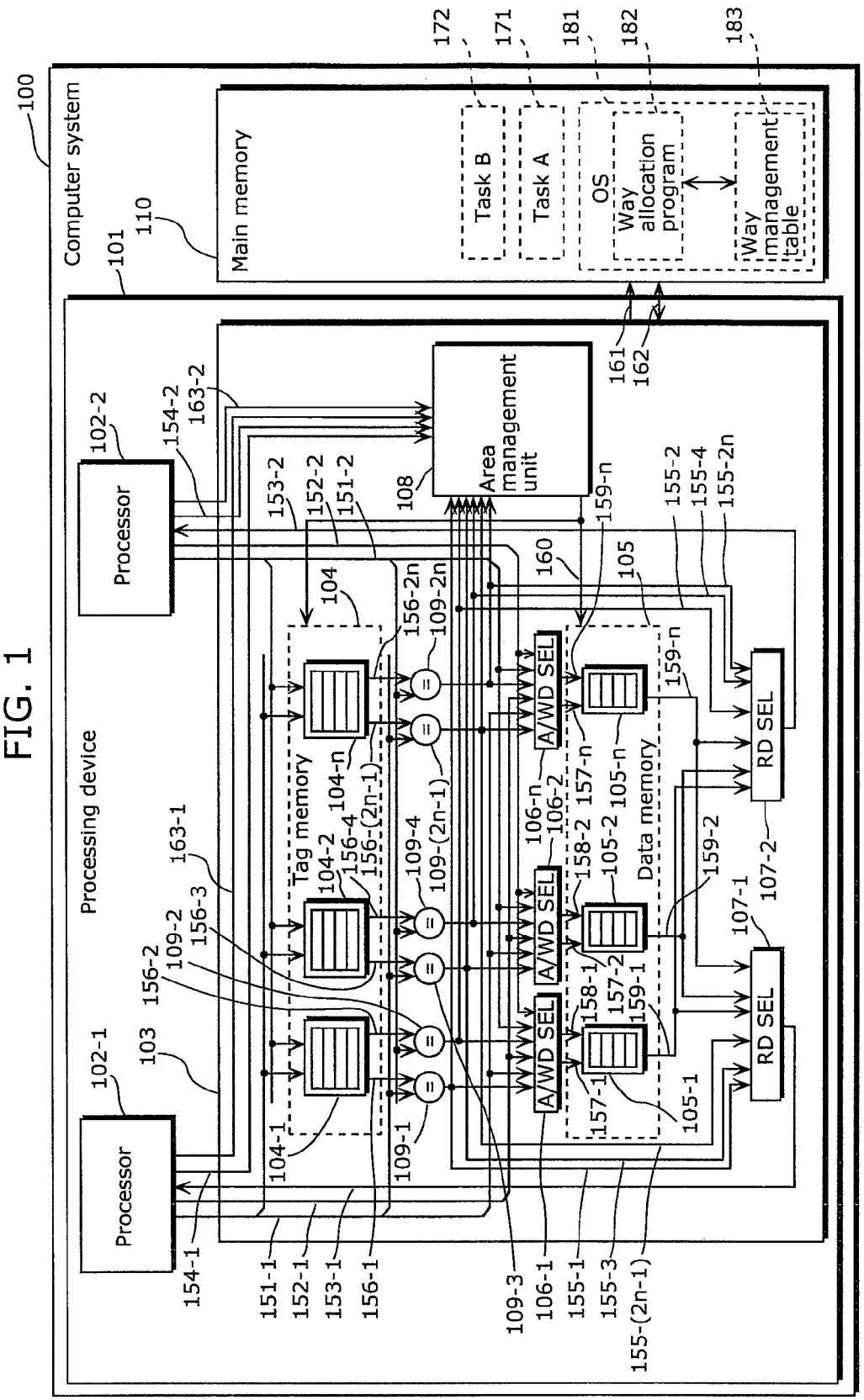
FIG. 1 is a diagram showing a configuration of a computer system according to a first embodiment of the present invention.

A first embodiment according to the present invention will now be described with reference to the drawings.

A processing device according to the present embodiment has the following characteristics (a) to (d).

(a) The processing device is a processing device which is included on a single chip, and the device includes: (a1) processors capable of executing tasks in parallel; and (a2) a cache memory shared by the processors, (a3) wherein the cache memory includes data storage units and read data selection units, (a3-1) each of the data storage units has one data output port, and (a3-2) each of the read data selection units is in a one-to-one association with each of the processors, and selects a data storage unit which stores data to be read to the associated processor, from among the data storage units.

(b) (b1) Each of the data storage units has one memory access request input port and one data input port, (b2) the cache memory includes memory access request selection units, and (b2-1) each of the memory access request selection units is in a one-to-one association with each of the data storage units, and selects a memory access request outputted from the processor which executes a task that is allocated to the associated data storage unit, from among memory access requests individually outputted from the processors.

(c) (c1) Each of the data storage units is classified into any one of data storage areas each made up of one or more the data storage units from among the data storage units, and (c2) the cache memory includes: (c2-1) an allocation information holding unit that hold allocation information indicating that a predetermined task has been allocated to a predetermined data storage area from among the data storage areas, in association with the predetermined data storage area; and (c2-2) an identification unit that identify, when a refill occurs for the predetermined task, the predetermined data storage area from among the data storage areas as a refillable data storage area, based on the allocation information held in the allocation information holding unit.

(d) (d1) The cache memory is an n-way set-associative cache memory, n being a natural number, and (d2) each of the data storage units is in a one-to-one association with each of the n-ways.

In addition, a computer system provided with a processing device according to the present embodiment has the following characteristics (e) and (f).

(e) The computer system includes (e1) the aforementioned processing device; and (e2) a main storage device which stores an allocation program, (e3) wherein when the predetermined task is created, the processing device allocates the predetermined data storage area for the predetermined task from among the data storage areas, and registers the allocation information in the allocation information holding unit in association with the predetermined data storage area, the processing device having executed the allocation program.

(f) The processing device manages allocation of tasks to each of the data storage areas, allocates a different data storage area from among the data storage areas for each task, and registers different allocation information for each task in the allocation information holding unit in association with a different data storage area for each task, the processing device having executed the allocation program.

In light of the above, a description will now be given using as an example a computer system provided with a processing device according to the present embodiment.

First, a configuration of a computer system according to the present embodiment will be described.

FIG. 1 is a diagram showing a configuration of a computer system according to the present embodiment. As shown in FIG. 1, a computer system 100 includes a processing device 101 in which processors 102-1, 102-2, a cache memory 103 and the like are included on a single chip. The computer system 100 further includes a main memory 110 that stores a task A 171, a task B 172, an operating system 181 and the like.

The processor 102-1 creates, in advance, a task such as the tasks A 171 and B 172 under the control of the operating system 181. At this point, a way allocation program 182 is executed. Accordingly, the processor 102-1 that is executing the way allocation program 182 references a way management table 183 and determines a way that is allocatable for the created task. Way reserved information that associates the determined way with the created task is generated. The generated way reserved information is then outputted via a signal line 163-1 to the cache memory 103. Way reserved information includes task identification information (hereinafter referred to as a task ID) and way identification information (hereinafter referred to as way number).

Subsequently, when executing a task, the processor 102-1 outputs a task ID allocated to the task to be executed via a signal line 154-1 to the cache memory 103. When accessing the cache memory 103 during the execution of a task, a memory access request that includes an access destination address is outputted via a signal line 151-1 to the cache memory 103. At this point, when the purpose of the access request is writing, data is written on the cache memory 103 via a signal line 152-1. When the purpose of the access request is reading, data is read from the cache memory 103 via a signal line 153-1. Note that the number of signal lines corresponding to data transfer size is necessary for the signal lines 152-1 and 153-1.

Note that, since the processor 102-2 is similar in configuration to the processor 102-1, a description thereof will be omitted. In addition, it is assumed that the instruction set of the processor 102-2 is the same as that of the processor 102-1.

The cache memory 103 is an n-way set-associative cache memory, n being a positive integer. In the present case, as an example, the cache memory 103 includes a tag memory 104, a data memory 105, memory access request/write data selection units 106-1 to 106-n, read data selection units 107-1 and 107-2, an area management unit 108, cache hit judgment units 109-1 to 109-2n, and the like.

The tag memory 104 is made up of multiport memories 104-1 to 104-n. The multiport memories 104-1 to 104-n are multiport memories individually corresponding to ways 1 to n.

A multiport memory is a memory having ports that are independently accessible. In this case, as an example, it is assumed that the multiport memory is a memory in which the number of the tag request input ports and the number of the tag output ports are respectively equivalent to the number of processors. A tag request input port is a port into which a tag request outputted from a processor is inputted. A tag output port is a port through which a tag corresponding to the inputted tag request is outputted.

For instance, in the case of the multiport memory 104-1, the respective ports connected to the signal line 151-1 and a signal line 151-2 correspond to tag request input ports. In addition, the respective ports connected to a signal line 156-1 and a signal line 156-2 correspond to tag output ports.

The data memory 105 is made up of single-port memories 105-1 to 105-n. The single-port memories 105-1 to 105-n are single-port memories individually corresponding to ways 1 to n.

A single-port memory is a memory having only one port that is independently accessible. In this case, as an example, a single-port memory is assumed to be a memory in which the respective numbers of ports of memory access request input ports, data input ports and data output ports are one. A memory access request input port is a port into which a memory access request outputted from a processor is inputted. A data input port is a port into which data to be written by a processor is inputted. A data output port is a port through which data to be read by a processor is outputted.

For instance, in the case of the single-port memory 105-1, the port that is connected to a signal line 157-1 corresponds to the memory access request input port. The port connected to a signal line 158-1 corresponds to the data input port. The port connected to a signal line 159-1 corresponds to the data output port.

The single-port memory 105-1 stores data read to a task associated with a way 1 and/or data written from the task. The multiport memory 104-1 stores tags associated with data stored in the single-port memory 105-1.

Note that, since the single-port memories 105-2 to 105-n are similar in configuration to the single-port memory 105-1, a description thereof will be omitted. Since the multiport memories 104-2 to 104-n are similar in configuration to the multiport memory 104-1, a description thereof will be omitted.

The size of data stored in the data memory 105 is by far greater than the size of the tag stored in the tag memory 104. Therefore, even configuring the data memory 105 using only a single-port memory can significantly reduce a circuit area.

Each of the memory access request/write data selection units 106-1 to 106-n are in a one-to-one association with each of the single-port memories 105-1 to 105-n, and selects a memory access request outputted from a processor executing the task allocated to the associated single-port memory from the memory access requests individually outputted from the processors 102-1 and 102-2.

Each of the read data selection units 107-1 and 107-2 are in a one-to-one association with each of the processors 102-1 and 102-2, and selects a single-port memory storing data to be read to the associated processor from the single-port memories 105-1 to 105-n.

The area management unit 108 holds way information indicating that a predetermined task has been allocated to a predetermined way in correspondence to the predetermined way, and when a refill occurs for the predetermined task, identifies a predetermined way among n-ways as a refillable way based on the held way information.

A tag is inputted to the cache hit judgment unit 109-1 from the tag memory 104-1 via the signal line 156-1. A memory access request is inputted from the processor 102-1 via the signal line 151-1.

The cache hit judgment unit 109-1 compares the inputted tag and an address included in the inputted memory access request. The comparison result is outputted as cache hit information. For instance, in the case where the tag and the address match, in other words, in the case of a cache hit, the cache hit judgment unit 109-1 outputs 0 as cache hit information. On the other hand, in the case where the tag and the address do not match, in other words, in a case of a cache miss, 1 is outputted as cache hit information.

A tag is inputted to the cache hit judgment unit 109-2 from the tag memory 104-1 via the signal line 156-2. A memory access request is inputted from the processor 102-2 via the signal line 151-2.

The cache hit judgment unit 109-2 compares the inputted tag and an address included in the inputted memory access request. The comparison result is outputted as cache hit information. For instance, in the case where the tag and the address match, in other words, in a case of a cache hit, the cache hit judgment unit 109-2 outputs 0 as cache hit information. On the other hand, in the case where the tag and the address do not match, in other words, in a case of a cache miss, 1 is outputted as cache hit information.

Note that since the cache hit judgment units 109-3 to 109-(2n-1) are similar in configuration to the cache hit judgment unit 109-1, a description thereof will be omitted. Since the cache hit judgment units 109-4 to 109-2n are similar in configuration to the cache hit judgment unit 109-2, a description thereof will be omitted.

An address and an access request are inputted to the main memory 110 from the cache memory 103 via a signal line 161.

The main memory 110 is provided with a memory controller (not illustrated). In the case where the access request is a write request, the memory controller (not illustrated) writes the data inputted from the cache memory 103 via a signal line 162 from the address. In the case where the access request is a read request, data read from the address is outputted to the cache memory 103 via the signal line 162.

Figure 2:
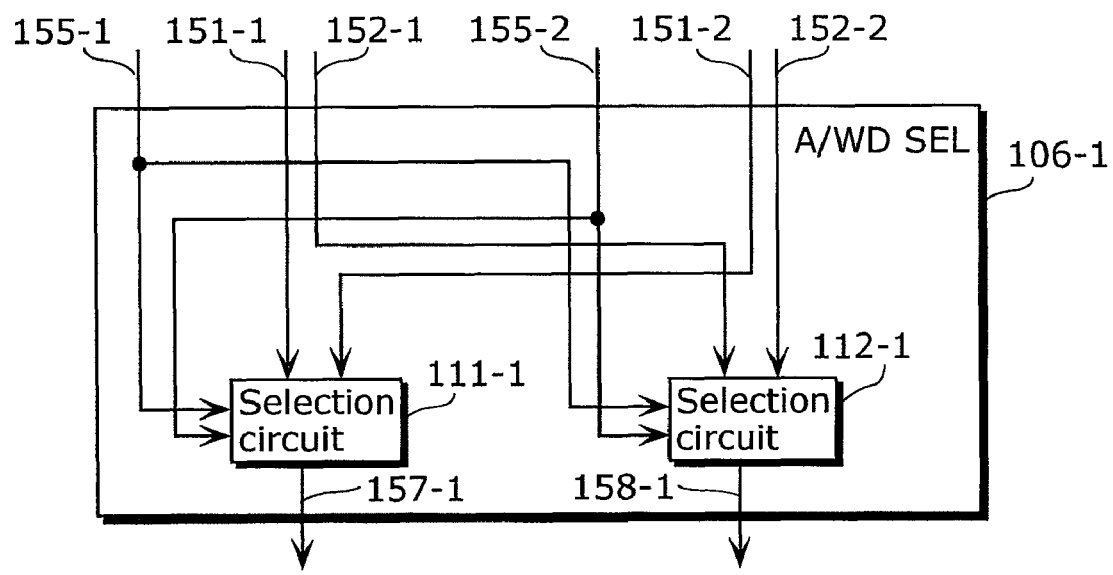
FIG. 2 is a diagram showing a configuration of a memory access request/write data selection unit according to the first embodiment of the present invention.

FIG. 2 is a diagram showing a configuration of the memory access request/write data selection units 106-1 to 106-n according to the present embodiment. As shown in FIG. 2, the memory access request/write data selection unit 106-1 includes a memory access signal selection circuit 111-1, a write data selection circuit 112-1, and the like.

Cache hit information outputted from the cache hit judgment unit 109-1 via a signal line 155-1 (hereinafter referred to as first cache hit information) is inputted as a control signal to the memory access signal selection circuit 111-1. Cache hit information outputted from the cache hit judgment unit 109-2 via a signal line 155-2 (hereinafter referred to as second cache hit information) is inputted as a control signal to the memory access signal selection circuit 111-1.

The memory access signal selection circuit 111-1 selects an input source according to the inputted first cache hit information and the inputted second cache hit information. When a memory access request is inputted from the selected input source, the inputted memory access request is outputted to the single-port memory 105-1 via the signal line 157-1.

For instance, assume that the first cache hit information inputted to the memory access signal selection circuit 111-1 is 0, and that the second cache hit information inputted to the memory access signal selection circuit 111-1 is 1. Further assume that a memory access request outputted from the processor 102-1 (hereinafter referred to as first memory access request) is inputted via the signal line 151-1 to the memory access signal selection circuit 111-1. In this case, the memory access signal selection circuit 111-1 outputs the first memory access request to the single-port memory 105-1 via the signal line 157-1.

In addition, assume that the first cache hit information inputted to the memory access signal selection circuit 111-1 is 1, and that the second cache hit information inputted to the memory access signal selection circuit 111-1 is 0. Further assume that a memory access request outputted from the processor 102-2 (hereinafter referred to as second memory access request) is inputted via the signal line 151-2 to the memory access signal selection circuit 111-1. In this case, the memory access signal selection circuit 111-1 outputs the second memory access request to the single-port memory 105-1 via the signal line 157-1.

Furthermore, assume that the first cache hit information and the second cache hit information inputted to the memory access signal selection circuit 111-1 are both 1. In this case, the memory access signal selection circuit 111-1 outputs neither the first memory access request nor the second memory access request.

Moreover, assume that the first cache hit information and the second cache hit information inputted to the memory access signal selection circuit 111-1 are both 0. In this case, the memory access signal selection circuit 111-1 outputs neither the first memory access request nor the second memory access request.

Cache hit information outputted from the cache hit judgment unit 109-1 (hereinafter referred to as first cache hit information) is inputted as a control signal via the signal line 155-1 to the write data selection circuit 112-1. In addition, cache hit information outputted from the cache hit judgment unit 109-2 (hereinafter referred to as second cache hit information) is inputted as a control signal via the signal line 155-2 to the write data selection circuit 112-1.

The write data selection circuit 112-1 selects an input source according to the inputted first cache hit information and the second cache hit information. When write data is inputted from the selected input source, the inputted write data is outputted to the single-port memory 105-1 via the signal line 158-1.

For instance, assume that the first cache hit information inputted to the write data selection circuit 112-1 is 0, and that the second cache hit information inputted to the write data selection circuit 112-1 is 1. Further assume that write data outputted from the processor 102-1 (hereinafter referred to as first write data) is inputted via the signal line 152-1. In this case, the write data selection circuit 112-1 outputs the first write data to the single-port memory 105-1 via the signal line 158-1.

In addition, assume that the first cache hit information inputted to the write data selection circuit 112-1 is 1, and that the second cache hit information inputted to the write data selection circuit 112-1 is 0. Further assume that write data outputted from the processor 102-2 (hereinafter referred to as second write data) is inputted via the signal line 152-2. In this case, the write data selection circuit 112-1 outputs the second write data to the single-port memory 105-1 via the signal line 158-1.

Furthermore, assume that the first cache hit information and the second cache hit information inputted to the write data selection circuit 112-1 are both 1. In this case, the write data selection circuit 112-1 outputs neither the first write data nor the second write data.

Moreover, assume that the first cache hit information and the second cache hit information inputted to the write data selection circuit 112-1 are both 0. In this case, the write data selection circuit 112-1 outputs neither the first write data nor the second write data.

Note that, since the memory access request/write data selection units 106-2 to 106-$n$ are similar in configuration to the memory access request/write data selection unit 106-1, a description thereof will be omitted.

Figure 3:
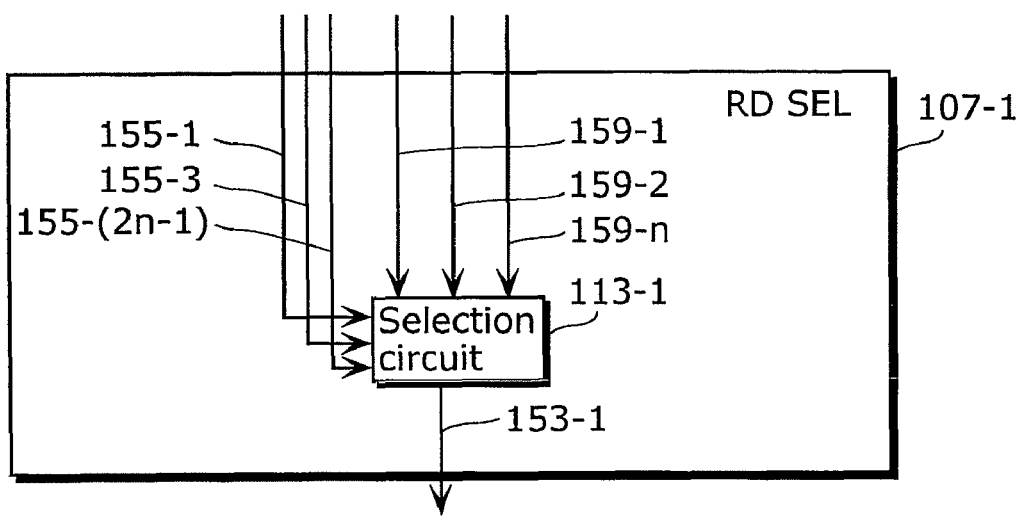
FIG. 3 is a diagram showing a configuration of a read data selection unit according to the first embodiment of the present invention.

FIG. 3 is a diagram showing a configuration of read data selection units 107-1 and 107-2 according to the present embodiment. As shown in FIG. 3, the read data selection unit 107-1 includes a read data selection circuit 113-1 and the like.

Cache hit information individually outputted from the cache hit judgment units 109-1 to 109-(2n-1) (hereinafter referred to as first cache hit information, . . . , (2n-1)th cache hit information) are individually inputted via signal lines 155-1 to 155-(2n-1) as a control signal to the read data selection circuit 113-1.

The read data selection circuit 113-1 selects an input source according to the individually inputted first cache hit information, . . . , (2n-1)th cache hit information. When read data is inputted from the selected input source, the inputted read data is outputted to the processor 102-1 via the signal line 153-1.

For instance, assume that, among the first cache hit information, . . . , the (2n-1)th cache hit information individually inputted to the read data selection circuit 113-1, the i-th cache hit information is 0 while other cache hit information is 1. Further assume that read data outputted from the single-port memory 105-$i$ (hereinafter referred to as i-th read data) is inputted via a signal line 159-$i$ among the signal lines 159-1 to 159-$n$. In this case, the read data selection circuit 113-1 outputs the i-th read data to the processor 102-1 via the signal line 153-1.

In addition, assume that, among the first cache hit information, . . . , the (2n-1)th cache hit information individually inputted to the read data selection circuit 113-1, a plurality of cache hit information is 0. In this case, the read data selection circuit 113-1 does not output any read data.

Furthermore, assume that, among the first cache hit information, . . . , the (2n-1)th cache hit information individually inputted to the read data selection circuit 113-1, all cache hit information is 1. In this case, the read data selection circuit 113-1 does not output any read data.

Note that, since the read data selection unit 107-2 is similar in configuration to the read data selection unit 107-1, a description thereof will be omitted.

Figure 4:
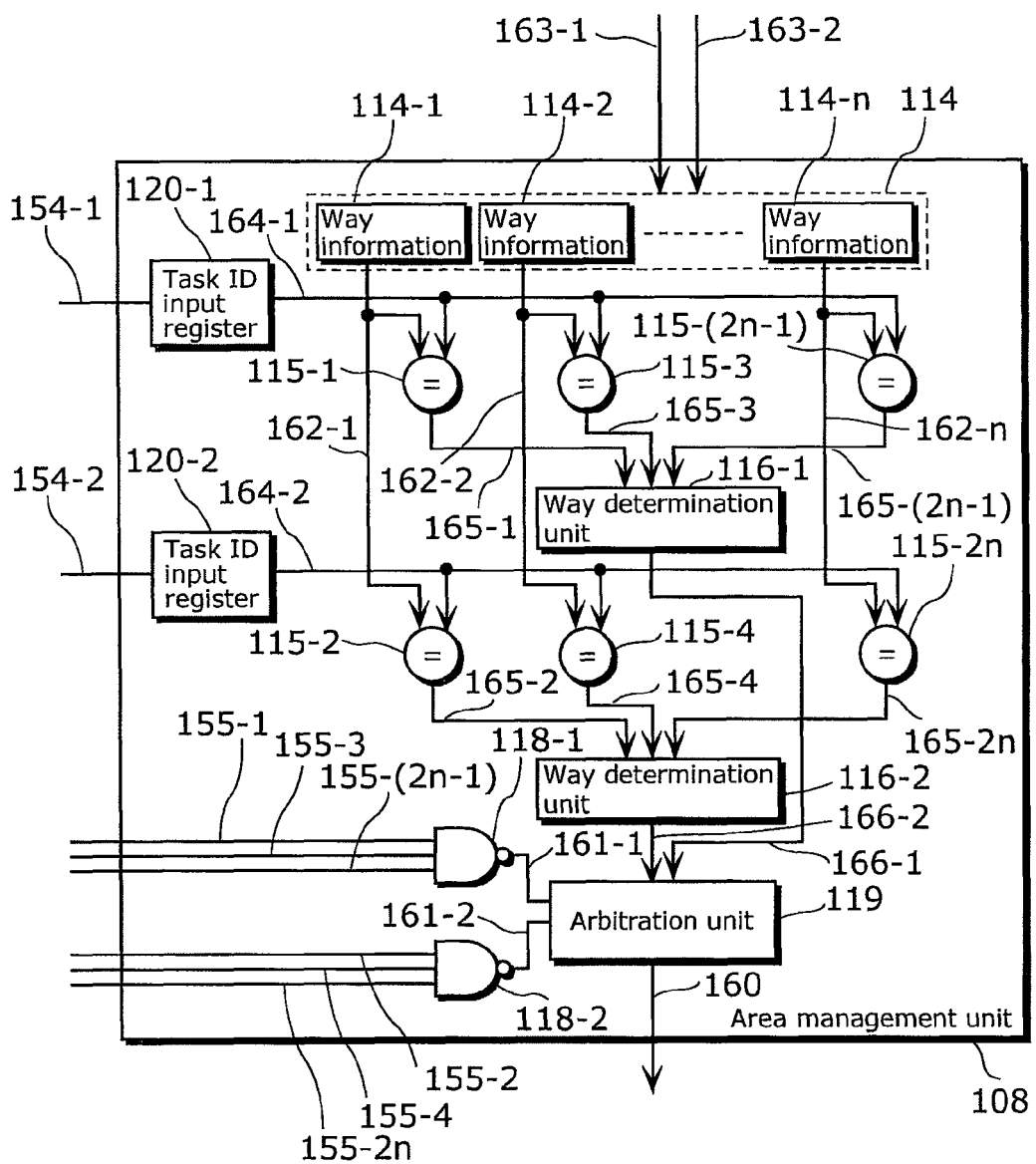
FIG. 4 is a diagram showing a configuration of an area management unit according to the first embodiment of the present invention.

FIG. 4 is a diagram showing a configuration of the area management unit 108 according to the present embodiment. As shown in FIG. 4, the area management unit 108 includes a way information holding unit 114, comparators 115-1 to 115-2n, way determination units 116-1 and 116-2, NAND circuits 118-1 and 118-2, an arbitration unit 119, task ID input registers 120-1 and 120-2, and the like.

The way information holding unit 114 is made up of way information holding areas 114-1 to 114-$n$. The way information holding areas 114-1 to 114-$n$ individually hold way information corresponding to the ways 1 to n. For each way information holding area, allocation information of either "enable" or "disable" is individually set with respect to task IDs ranging from 0 to m (where m is a positive integer). In this case, "disable" is set as a default value.

Then, when a task is created, the way allocation program 182 registers allocation information ("enable") indicating that the created task has been allocated to a way information holding area corresponding to a way that has been allocated to the created task. Then, when a task is deleted, the way allocation program 182 deletes allocation information ("enable") indicating that the deleted task had been allocated from a way information holding area corresponding with the way that had been allocated to the deleted task. Note that, when "enable" is deleted, allocation information changes to "disable."

The way information holding area 114-1 holds way information regarding way 1 which includes the multiport memory 104-1 and the single-port memory 105-1. For this way information, "enable" is set to a task ID allocated to the way 1 while "disable" is set to other task IDs. Note that, since the way information holding areas 114-2 to 114-$n$ are similar in configuration to the way information holding area 114-1, a description thereof will be omitted.

Way information is further individually inputted from the processors 102-1 and 102-2 to the way information holding unit 114 via the signal lines 163-1 and 163-2.

The way information holding unit 114 holds individually inputted way information to relevant way information holding areas.

Way information is inputted to the comparator 115-1 from the way information holding area 114-1 via the signal line 162-1. A task ID is inputted from the task ID register 120-1 via the signal line 164-1.

The comparator 115-1 compares the inputted way information and the inputted task ID. The comparison result is outputted as way match information.

Way information is inputted to the comparator 115-2 from the way information holding area 114-1 via the signal line 162-1. A task ID is inputted from the task ID register 120-2 via the signal line 164-2.

The comparator 115-2 compares the inputted way information and the inputted task ID. The comparison result is outputted as way match information.

Note that, since the comparators 115-3 to 115-(2n-1) are similar in configuration to the comparator 115-1, a description thereof will be omitted. Since the comparators 115-4 to 115-2n are similar in configuration to the comparator 115-2, a description thereof will be omitted.

Way match information is individually inputted from the comparators 115-1 to 115-(2n-1) to the way determination unit 116-1 via the signal lines 165-1 to 165-(2n-1).

The way determination unit 116-1 determines a refill object way based on individually inputted way match information. Information regarding the determined way is outputted as refill way information.

Note that, since the way determination unit 116-2 is similar in configuration to the way determination unit 116-1, a description thereof will be omitted.

Cache hit information is individually inputted from the cache hit judgment units 109-1 to 109-(2n-1) to the NAND circuit 118-1 via the signal lines 155-1 to 155-(2n-1).

When all individually inputted cache hit information is 1, the NAND circuit 118-1 outputs 0 as control information. Otherwise, NAND circuit 118-1 outputs 1 as control information. Note that, since the NAND circuit 118-2 is similar in configuration to the NAND circuit 118-1, a description thereof will be omitted.

When control information outputted from the NAND circuit 118-1 is inputted via the signal line 161-1, based on the inputted control information, the arbitration unit 119 judges whether it is necessary to refill the way allocated to the processor 102-1.

For instance, assume that the control information inputted to the arbitration unit 119 is 1. In this case, since the cache is a hit, the arbitration unit 119 judges that it is not necessary to refill the way allocated to the processor 102-1.

On the other hand, assume that the control information inputted to the arbitration unit 119 is 0. In this case, since the cache is not a hit, the arbitration unit 119 judges that it is necessary to refill the way allocated to the processor 102-1. Then, the arbitration unit 119 outputs a refill way instruction instructing the refill of the way allocated to the processor 102-1 to the tag memory 104 and the data memory 105 via the signal line 160. At this point, the way allocated to the processor 102-1 is identified by refill way information outputted from the way determination unit 116-1 via the signal line 166-1.

In the same manner, when control information outputted from the NAND circuit 118-2 is inputted via the signal line 161-2, based on the inputted control information, the arbitration unit 119 judges whether it is necessary to refill the way allocated to the processor 102-2.

For instance, assume that the control information inputted to the arbitration unit 119 is 1. In this case, the arbitration unit 119 judges that the cache is a hit, and judges that it is not necessary to refill the way allocated to the processor 102-2. On the other hand, assume that the control information inputted to the arbitration unit 119 is 0. In this case, the arbitration unit 119 judges that the cache is not a hit, and judges that it is necessary to refill the way allocated to the processor 102-2.

Then, the arbitration unit 119 outputs a refill way instruction instructing the refill of the way allocated to the processor 102-2 to the tag memory 104 and the data memory 105 via the signal line 160. At this point, the way allocated to the processor 102-2 is identified by refill way information inputted to the arbitration unit 119 from the way determination unit 116-2 via the signal line 166-2.

When a refill way instruction outputted from the area management unit 108 is inputted via the signal line 160, a cache controller (not illustrated) that controls the tag memory 104 and the data memory 105 identifies a way to be refilled based on the inputted refill way instruction. The cache controller also reads data from the main memory 110, and writes the read data into the identified way. Note that, when refill object ways exist, a way to be refilled is identified using the LRU (Least Recently Used) method, the FIFO (First In First Out) method, the random method, or the like.

A task ID is inputted to the task ID input register 120-1 from the processor 102-1 via the signal line 154-1.

The task ID input register 120-1 holds the inputted task ID. Note that, since the task ID input register 120-2 is similar in configuration to the task ID input register 120-1, a description thereof will be omitted.

Next, a data structure of a way management table according to the present embodiment will be described.

FIG. 5 is a diagram showing a data structure of a way management table according to the present embodiment. As shown in FIG. 5, a way management table 183 is a table in which ways and tasks are associated. For each task ID, "enable" is set to ways that are allocatable for the task of the task ID. For each task ID, "disable" is set to ways that are not allocatable for the task of the task ID. For instance, the way 1 is allocatable for tasks having task ID 0.

For example, way information of a row regarding the way 1 in the way management table 183 is held in the way information holding area 114-1. In a similar manner, way information of a row regarding the way n in the way management table 183 is held in the way information holding area 114-*n*.

Next, way allocation processing executed by the way allocation program according to the present embodiment will be described.

Figure 6:
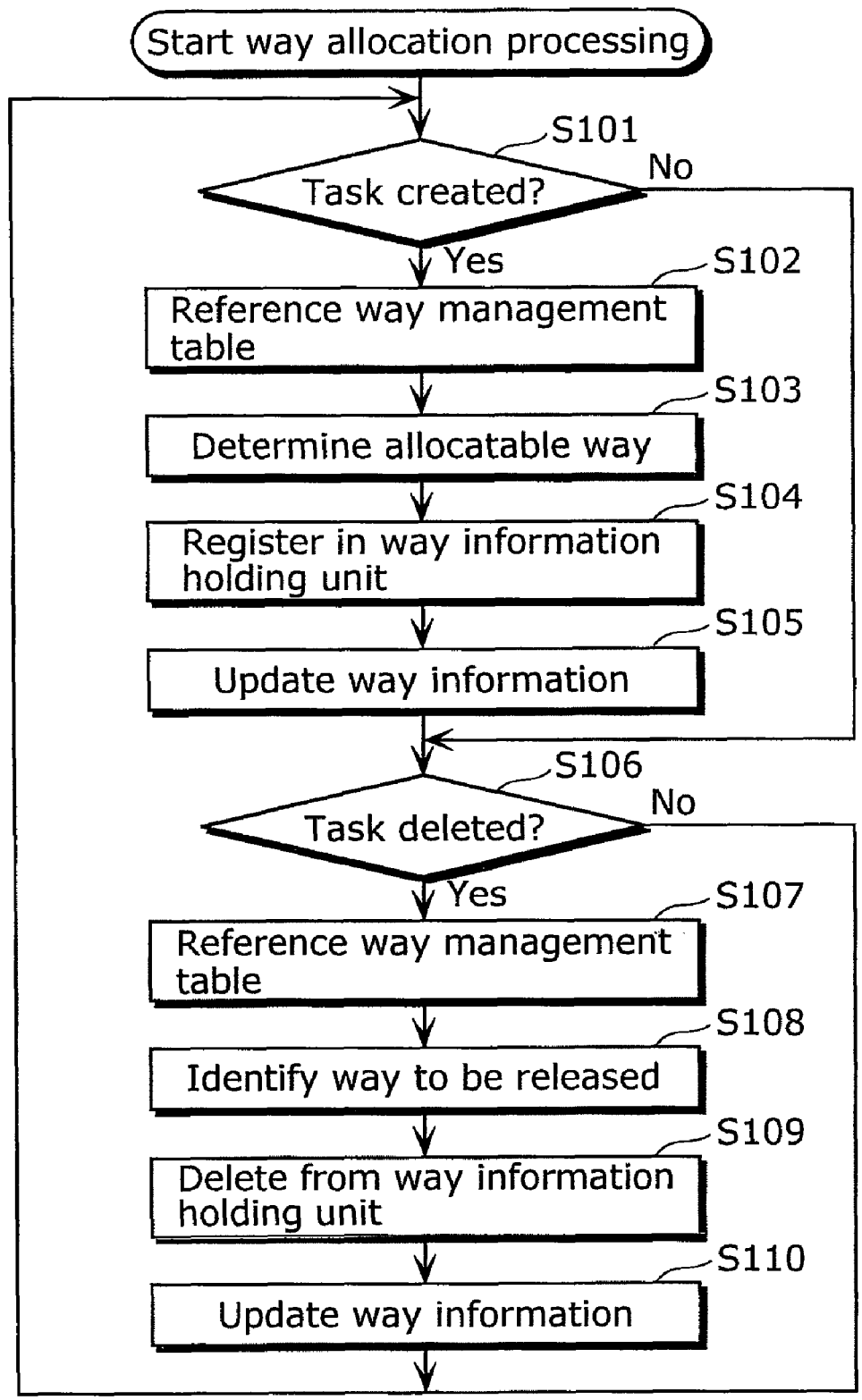
FIG. 6 is a diagram showing a flowchart of way allocation processing according to the first embodiment of the present invention.

FIG. 6 is a diagram showing a flowchart of way allocation processing according to the present embodiment. As shown in FIG. 6, when a task is created under the control of the operating system 181 (S101: Yes), the way allocation program 182 is executed by either the processor 102-1 or the processor 102-2. More specifically, the processor that has executed the way allocation program 182 references the way management table 183 (S102), and determines an allocatable way from the referenced way management table 183 (S103). At this point, different way are selected for each task.

After selecting the allocatable way, the processor registers allocation information that indicates that the created task has been allocated ("enable") to a way information holding area corresponding to the selected way among way information holding areas making up the way information holding unit 114 (S104). The way information holding unit 114 is updated (S105).

In addition, when the task is deleted (S106), the way management table 183 is referenced (S107). The way to be released is identified (S108). Allocation information indicating that the deleted task had been allocated ("enable") is deleted from a way information holding area corresponding to the identified way among way information holding areas making up the way information holding unit 114 (S109). The way information holding unit 114 is updated (S110).

As seen, according to the processing device 101 of to the present embodiment, by configuring the portions connecting the data storage units with the processors as a simple selection circuit such as the read data selection unit, a processing device having processors can be configured using a smaller amount of hardware.

In addition, with a refill created due to the execution of a predetermined task, inadvertent rewriting of a data storage unit allocated to another task can be avoided. Furthermore, since access with respect to the predetermined task is restricted to a predetermined data storage area, access conflicts to the same data storage unit can be avoided.

Moreover, since simultaneous access from processors to the same data storage unit will no longer occur, a memory access request input port of a data storage unit need not be provided for each processor, and can instead be shared by the processors.

In addition, since simultaneous writing of data from processors to the same data storage unit or simultaneous reading of data to the processors from the same data storage unit will no longer occur, the data input port and data output port of a data storage unit can both be shared by the processors.

As a result, a single-port memory having a smaller cell area as compared to a multiport memory can be used as the data storage unit, thereby improving area reduction of the cache memory as well as cost reduction. In addition, since access conflicts to the same data storage unit can be avoided and therefore arbitration due to access conflict is no longer necessary, the improvement of processing performance may be promoted.

Furthermore, according to the computer system 100 of the present embodiment, even when tasks are simultaneously executed by processors, since each task is managed in association with each data storage area, tasks can be executed while avoiding access conflicts to the same data storage unit.

Moreover, even when an arbitrary task is executed by an arbitrary processor, since a different data storage area is allocated for each task, tasks can be executed while avoiding access conflicts to the same data storage area.

In turn, since access conflicts to one or more data storage units making up a data storage area can also be avoided, a memory access request input port, a data input port and a data output port can respectively be shared by processors. In addition, a single-port memory having a smaller cell area as compared to a multiport memory can be used as the data storage unit, thereby improving area reduction of the cache memory as well as cost reduction.

Note that, in the present embodiment, while the configuration of processing device 101 has been shown so as to include two processors, the number of processors need not be limited to two, and the present embodiment is applicable to three or more processors.

Moreover, in the present embodiment, a different data storage area is allocated for each task. However, in the case where deterioration of processing performance due to refill occurrences is permitted, it is possible to allocate the same data storage area to a portion of the tasks.

Furthermore, in the present embodiment, a single way is allocated to a task. However, ways may instead be allocated to a task. For instance, assume that each of the ways is classified into any one of data storage areas respectively made up of one or more ways. When a task is created, the processing device 101 having executed the way allocation program 182 allocates a data storage area to the created task from the data storage areas, and registers way information in the way information holding unit 114 in association with the data storage area.

Second Embodiment

A second embodiment according to the present invention will now be described with reference to the drawings.

A computer system according to the present embodiment has the following characteristic (g).

(g) The processing device classifies each of the data storage areas into any one of cache areas that are respectively in a one-to-one association with each of the processors, to manage allocation of tasks to each of the data storage areas, allocates a data storage area within a predetermined cache area in association with the predetermined processor from among the cache areas, for a task that is executed by the predetermined processor from among the processors, and registers a plurality of allocation information that individually identifies tasks to be executed by the predetermined processor, in the allocation information holding unit in association with the predetermined cache area, the processing device having executed the allocation program.

In light of the above, a computer system according to the present embodiment will now be described. Note that like structures to those of the first embodiment are assigned like reference characters, and descriptions thereof will be omitted.

First, a configuration of a computer system according to the present embodiment will be described.

Figure 7:
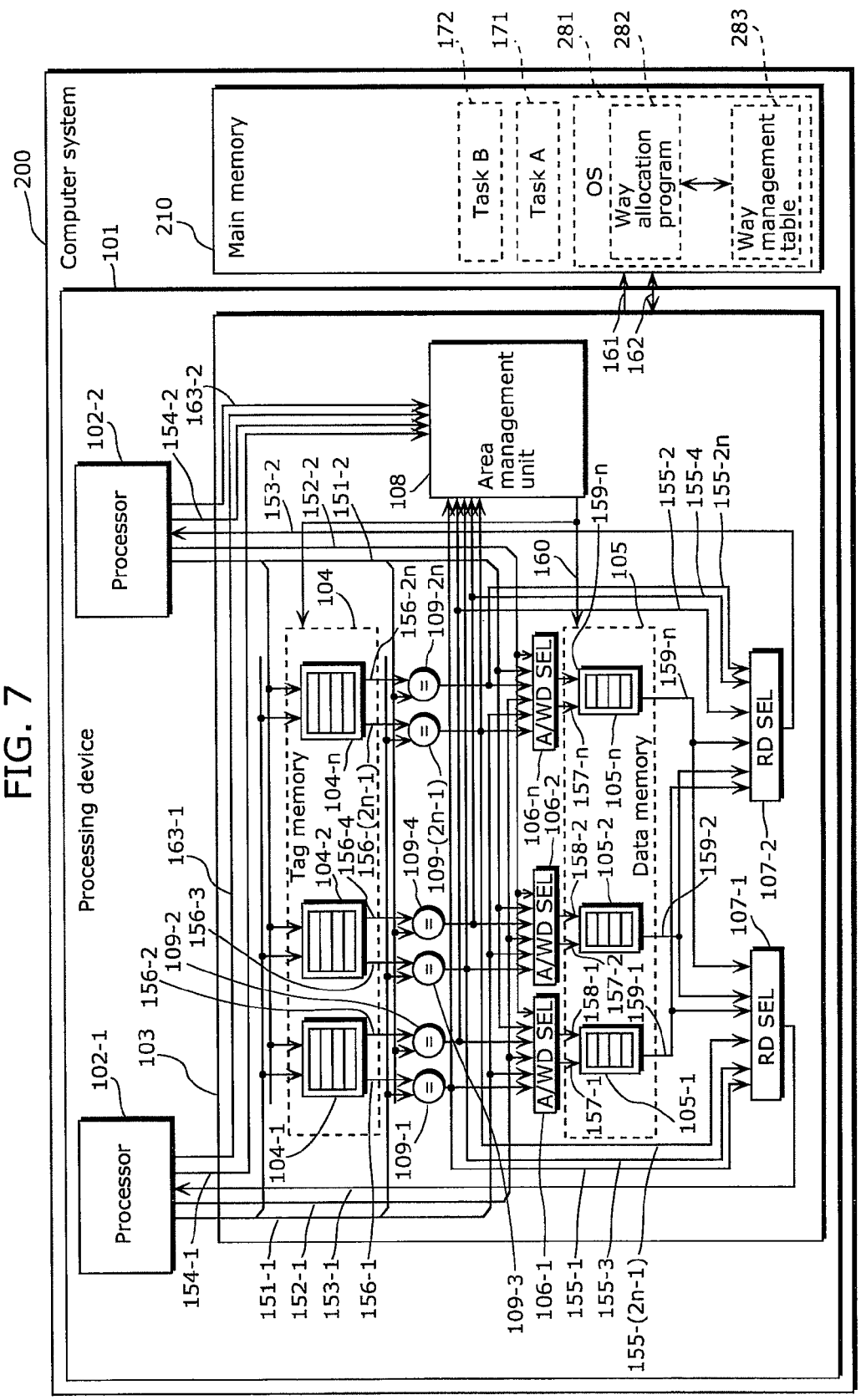
FIG. 7 is a diagram showing a configuration of a computer system according to a second embodiment of the present invention.

FIG. 7 is a diagram showing a configuration of a computer system according to the present embodiment. As shown in FIG. 7, in comparison to the computer system 100 according to the first embodiment (for instance, refer to FIG. 1), a computer system 200 includes a main memory 210 instead of the main memory 110. In addition, an operating system 281 is expanded in the main memory 210 instead of the operation system 181. The operating system 281 includes a way allocation program 282 and a way management table 283 instead of the way allocation program 182 and the way management table 183.

Assume that the way allocation program 282 is executed by either the processor 102-1 or the processor 102-2. Assume that ways 1 to n are classified into a first cache area and a second cache area. The first cache area is an area to which ways allocated for tasks to be executed by the processor 102-1 belong. The second cache area is an area to which ways allocated for tasks to be executed by the processor 102-2 belong.

In this case, the processor that had executed the way allocation program 282 classifies the tasks into tasks to be executed by the processor 102-1 and tasks to be executed by the processor 102-2. For a task to be executed by the processor 102-1, a way is allocated from the first cache area. For a task to be executed by the processor 102-2, a way is allocated from the second cache area.

Next, a data structure of a way management table according to the present embodiment will be described.

FIG. 8 is a diagram showing a data structure of a way management table according to the present embodiment. As shown in FIG. 8, a way management table 283 is a table in which executing processors, ways and tasks are associated. For each task ID, "enable" is set to ways that are allocatable for the task of the task ID. For each task ID, "disable" is set to ways that are not allocatable for the task of the task ID. For instance, ways 1, 2 (hereinafter referred to as first cache area) are allocatable for tasks having task IDs 0 and 1. Ways 3 to n (hereinafter referred to as second cache area) are allocatable for tasks having task IDs 2 to m. In addition, for each task ID, either the processor 102-1 or the processor 102-2 is set as the executing processor of a task of the task ID. For instance, tasks having task IDs 0 and 1 are executed by the processor 102-1. Tasks having task IDs 2 to m are executed by the processor 102-2.

In other words, by the processor that had executed the way allocation program 282, ways from the first cache area are allocated tasks to be executed by the processor 102-1 (tasks having task IDs 0 and 1). Ways from the second cache area are allocated to tasks to be executed by the processor 102-2 (tasks having task IDs 2 to m).

Next, way allocation processing executed by the way allocation program according to the present embodiment will be described.

Figure 9:
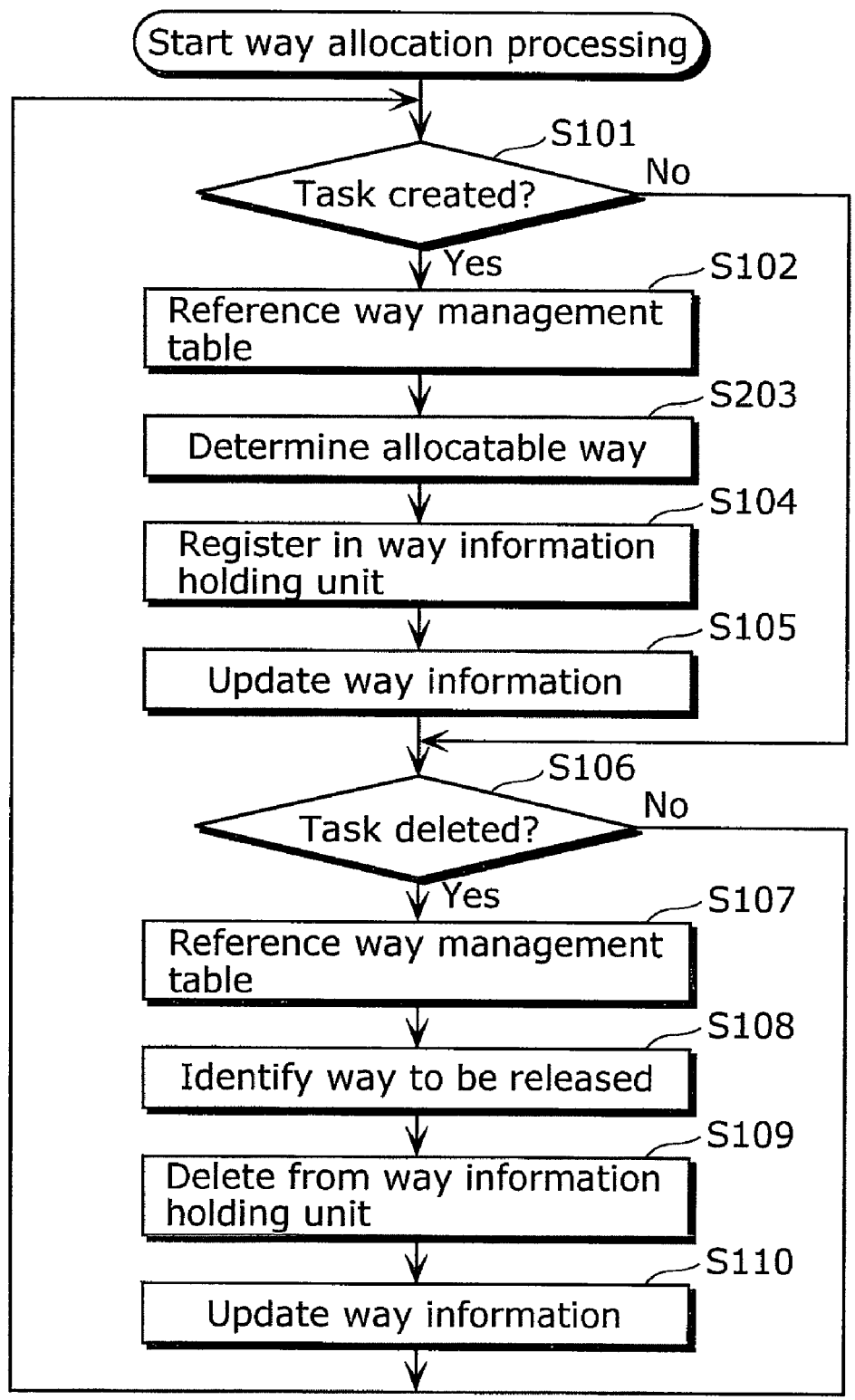
FIG. 9 is a diagram showing a flowchart of way allocation processing according to the second embodiment of the present invention.

FIG. 9 is a diagram showing a flowchart of way allocation processing according to the present embodiment. As shown in FIG. 9, when a task is created under the control of the operating system 281 (S101: Yes), the way allocation program 282 is executed by either the processor 102-1 or the processor 102-2. More specifically, the processor that has executed the way allocation program 282 references the way management table 283 (S102), and determines allocatable ways from the referenced way management table 283 (S203).

At this point, for a task to be executed by the processor 102-1, a way is selected from the first cache area. In addition, for a task to be executed by the processor 102-2, a way is selected from the second cache area.

After selecting the allocatable way, the processor registers allocation information that indicates that the created task has been allocated ("enable") to a way information holding area corresponding to the selected way among way information holding areas making up the way information holding unit 114 (S104). The way information holding unit 114 is updated (S105).

In addition, when the task is deleted (S106), the way management table 283 is referenced (S107). The way to be released is identified (S108). Allocation information indicating that the deleted task had been allocated ("enable") is deleted from the way information holding area corresponding to the identified way (S109). The way information holding unit 114 is updated (S110).

As seen, according to the computer system 200 of the present embodiment, even when the number of data storage areas classified into a predetermined cache area is smaller than the number of tasks to be executed by a predetermined processor, tasks can be executed while avoiding access conflicts to the same data storage area. This is due to the fact that accessible data storage areas are limited for each processor and simultaneous access to the same data storage area by processors is prevented.

In turn, since access conflicts to one or more data storage units making up a data storage area can also be avoided, a memory access request input port, a data input port and a data output port can respectively be shared by processors. In addition, a single-port memory having a smaller cell area as compared to a multiport memory can be used as the data storage unit, thereby improving area reduction of the cache memory as well as cost reduction.

For example, the computer system 100 according to the first embodiment requires that all tasks are allocated to different ways, and therefore has a problem in that the computer system 100 is not usable without modification when the number of ways n in the possession of the processing device 101 is smaller than the number of tasks m.

Conversely, according to the computer system 200 of the present embodiment, such a problem can be solved.

When a task is executed by the processors 102-1 and 102-2 which are allocated in advance, tasks to be executed simultaneously will not create access conflicts to the same storage area, and improvement of processing performance can be achieved in the case where a cache access by one of the processors causes an access by the other processor to wait. Moreover, in the present embodiment, while the data storage areas made up of ways have been allocated, each storage data storage area need only be made up of one or more ways. Therefore, the number of ways required in the present embodiment need only be equal to the number of processors.

Third Embodiment

A third embodiment according to the present invention will now be described with reference to the drawings.

A computer system according to the present embodiment has the following characteristic (h).

(h) The processing device classifies each of the data storage areas that make up the predetermined cache area into either a first partial cache area made up of data storage areas that are allocatable only to a task or a second partial cache area made up of data storage areas that are allocatable for tasks, and when a task executed by the predetermined processor is a task of a predetermined type, a data storage area is allocated from the first partial cache area, and when a task executed by the predetermined processor is not a task of the predetermined type, a data storage area is allocated from the second partial cache area, the processing device having executed the allocation program.

In light of the above, the computer system according to the present embodiment will now be described. Note that like structures to those of the second embodiment are assigned like reference characters, and descriptions thereof will be omitted.

Figure 10:
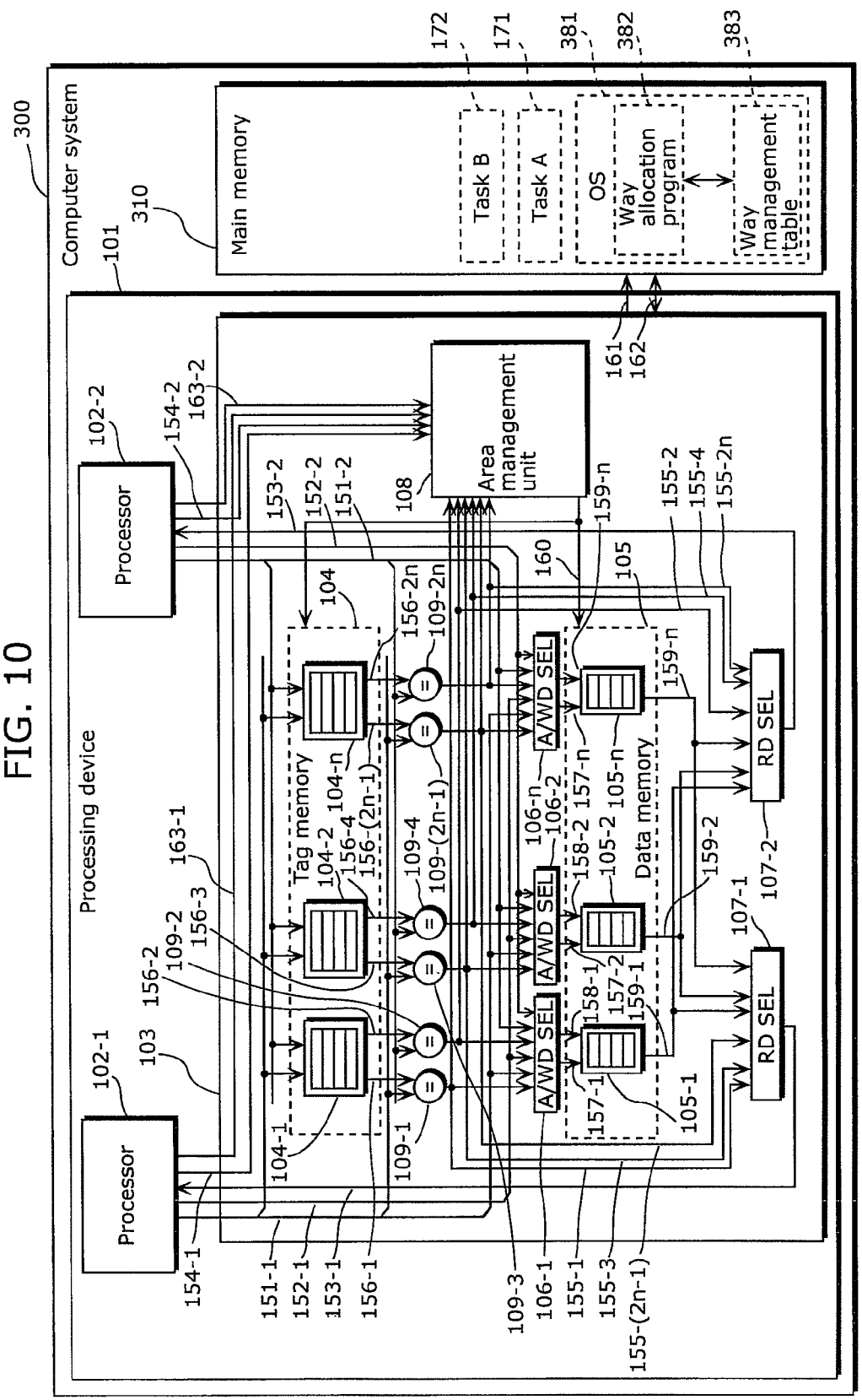
FIG. 10 is a diagram showing a configuration of a computer system according to a third embodiment of the present invention.

FIG. 10 is a diagram showing a configuration of a computer system according to the present embodiment. As shown in FIG. 10, in comparison to the computer system 200 according to the second embodiment (for instance, refer to FIG. 7), a computer system 300 includes a main memory 310 instead of the main memory 210. In addition, an operating system 381 is expanded in the main memory 310 instead of the operation system 281. The operating system 381 includes a way allocation program 382 and a way management table 383 instead of the way allocation program 282 and the way management table 283.

Assume that the way allocation program 382 is executed by either the processor 102-1 or the processor 102-2. Assume that ways 1 to n are classified into a first cache area and a second cache area. The first cache area is an area to which ways allocated for tasks to be executed by the processor 102-1 belong. The second cache area is an area to which ways allocated for tasks to be executed by the processor 102-2 belong.

In this case, the processor that had executed the way allocation program 382 classifies the tasks into tasks to be executed by the processor 102-1 and tasks to be executed by the processor 102-2. For a task to be executed by the processor 102-1, a way is allocated from the first cache area. For a task to be executed by the processor 102-2, a way is allocated from the second cache area. In addition, predetermined ways are allocated to predetermined tasks.

FIG. 11 is a diagram showing a data structure of a way management table according to the present embodiment. As shown in FIG. 11, a way management table 383 is a table in which executing processors, ways and tasks are associated. For each task ID, "enable" is set to ways that are allocatable for the task of the task ID. For each task ID, "disable" is set to ways that are not allocatable for the task of the task ID. For instance, the way 1 (hereinafter referred to as a first cache area) is allocatable for tasks having task IDs 0 and 1. Only the way 2 among the ways 2 to n (hereinafter referred to as a second cache area) is allocatable for the task having the task ID 2. Only the ways 3 and 4 among the second cache area are allocatable for tasks having the task IDs 3 and 4. Only the way n among the second cache area is allocatable for the task having the task ID m.

In addition, for each task ID, either the processor 102-1 or the processor 102-2 is set as the executing processor of a task of the task ID. For instance, tasks having the task IDs 0 and 1 are executed by the processor 102-1. Tasks having the task IDs 2 to m are executed by the processor 102-2.

In this case, as an example, assume that the task IDs such as 2 or m are set to tasks, among tasks to be executed by the processor 102-2, which would preferably use a way on an occupied-basis such as tasks having a long occupancy time (high-load tasks). In addition, assume that task IDs such as 3 or 4 are set to tasks that less likely to cause problems when sharing a way, such as tasks having a short occupancy time (low-load tasks).

In other words, by the processor that had executed the way allocation program 382, for a task to be executed by the processor 102-1 (tasks having task IDs 0 and 1), a way is allocated from the first cache area. For a task to be executed by the processor 102-2 (tasks having task IDs 2 to m), a way is allocated from the second cache area.

In addition, as for the second cache area, each way making up the second cache area is classified into either one of a first partial cache area made up of ways allocatable only to a task and a second partial cache area made up of ways allocatable for tasks. When the task to be executed by the processor 102-2 is a task of a predetermined type (high-load task), a way is allocated from the first partial cache area. On the other hand, when the task to be executed by the processor 102-2 is not a task of a predetermined type (high-load task), a way is allocated from the second partial cache area.

In other words, with the way allocation program 282 according to the second embodiment, the way management table 283 allows any way belonging to the first cache area (second cache area) to be allocated. However, the way allocation program 382 according to the present embodiment differs in that, even for ways belonging to the first cache area (second cache area), allocatable ways are limited depending on the task, using the way allocation table 383.

Figure 12:
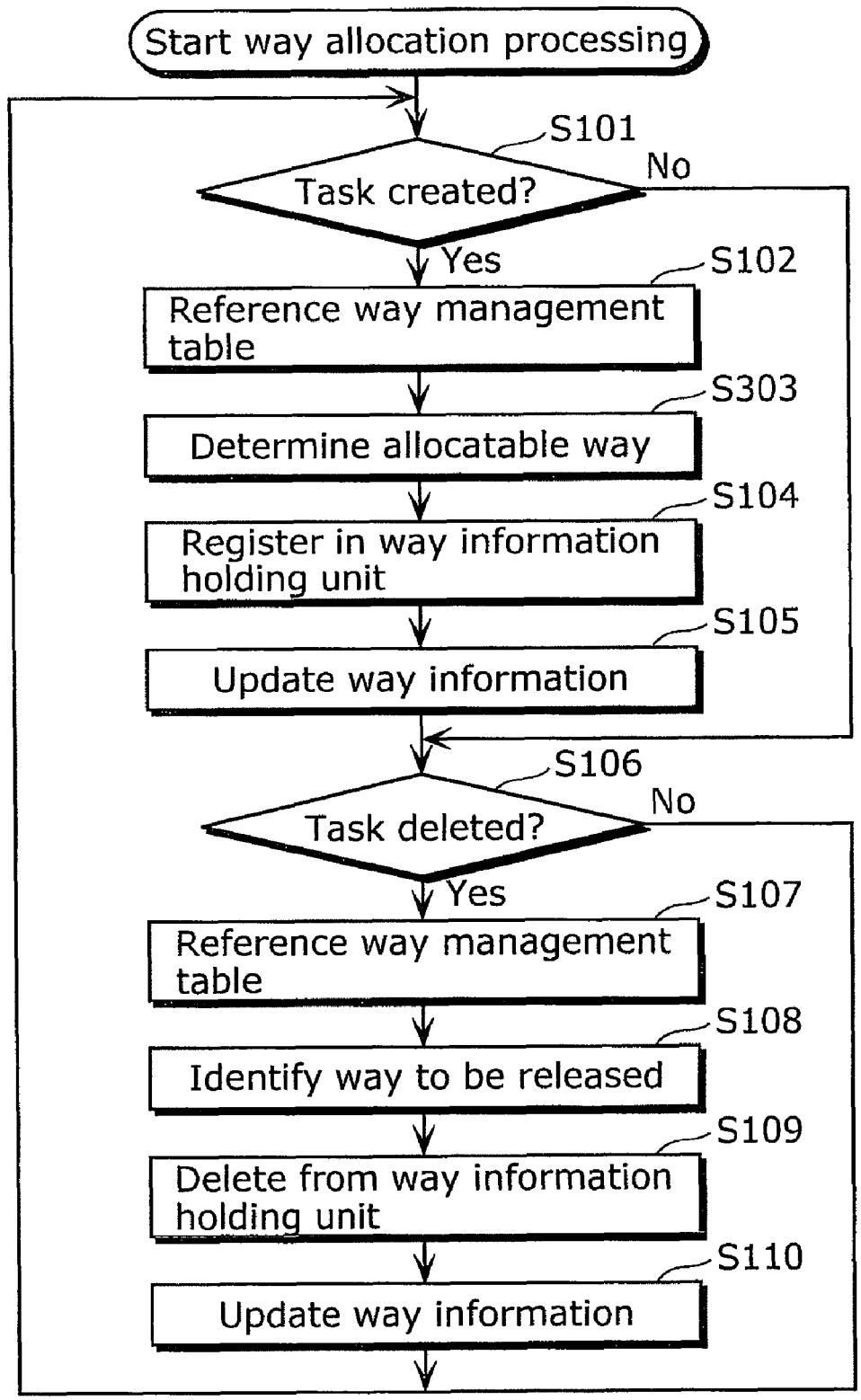
FIG. 12 is a diagram showing a flowchart of way allocation processing according to the third embodiment of the present invention.

FIG. 12 is a diagram showing a flowchart of way allocation processing according to the present embodiment. As shown in FIG. 12, when a task is created under the control of the operating system 381 (S101: Yes), the way allocation program 382 is executed by either the processor 102-1 or the processor 102-2. More specifically, the processor that has executed the way allocation program 382 references the way management table 383 (S102), and determines allocatable ways from the referenced way management table 383 (S303).

At this point, for a task to be executed by the processor 102-1, a way is selected from the first cache area. In addition, for a task to be executed by the processor 102-2, a way is selected from the second cache area. Note that, upon selecting a way from each cache area, a way is selected from among ways which are limited by the task.

After selecting an allocatable way, the processor registers allocation information that indicates that the created task has been allocated ("enable") to a way information holding area corresponding to the selected way among way information holding areas making up the way information holding unit 114 (S104). The way information holding unit 114 is updated (S105).

In addition, when the task is deleted (S106), the way management table 383 is referenced (S107). The way to be released is identified (S108). Allocation information indicating that the deleted task had been allocated ("enable") is deleted from the way information holding area corresponding to the identified way (S109). The way information holding unit 114 is updated (S110).

As seen, according to the computer system 300 of the present embodiment, even when the number of data storage areas classified into a predetermined cache area is smaller than the number of tasks to be executed by a predetermined processor, tasks can be executed while avoiding access conflicts to the same data storage area. This is due to the fact that the accessible data storage areas are limited for each processor and simultaneous access to the same data storage area by processors is prevented.

In turn, since access conflicts to one or more data storage units making up a data storage area can also be avoided, a memory access request input port, a data input port and a data output port can respectively be shared by processors. In addition, a single-port memory having a smaller cell area as compared to a multiport memory can be used as the data storage unit, thereby improving area reduction of the cache memory as well as cost reduction.

Furthermore, since different data storage areas are allocated for tasks to be executed by a predetermined processor, cache misses due to task switching may be reduced, thereby promoting the improvement of processing performance.

For instance, assume that the same data storage area is allocated for tasks to be executed by a predetermined processor. In this case, a large number of tasks can be allocated to the predetermined processor. However, a cache miss is likely to occur when switching among these tasks.

On the other hand, assume that different data storage areas are allocated to these tasks. In this case, a large number of tasks can no longer be allocated to the predetermined processor. However, this means that a cache miss is now less likely to occur when switching among these tasks.

With the computer system 200 according to the second embodiment, it is possible to avoid access conflicts to the same storage area among tasks to be executed simultaneously. When the tasks to be executed per processor are switched, a previously executed task uses a storage area that has been used, Thus, there are possibilities that cache misses will occur every time tasks to be executed on a processor are switched, resulting in deterioration of processing performance as compared to the performance during cache hits.

Conversely, according to the computer system 300 of the present embodiment, such a problem can be solved.

In addition, when a task is executed by the processors 102-1 and 102-2 which are allocated in advance, tasks to be executed simultaneously will not create access conflicts to the same storage area, and the deterioration of processing performance in that a cache access by one of the processors causes an access by the other processor to wait can be avoided. Furthermore, the way 2 to which the task 2 is allocated will not be used by other tasks to be executed by the processor 102-2 that executes the task 2, and will be updated neither by the tasks to be executed simultaneously nor by task switching in the processor 102-2.

As seen, by allocating different cache areas for each task executed by the respective processors, deterioration of performance due to access conflicts caused by tasks to be executed simultaneously can be avoided in the same manner as in the second embodiment. Moreover, solely for a portion of tasks, by allocating storage areas among the cache area that differ from other tasks, it is now possible to reduce cache misses due to task switching and to improve processing performance even when the number of ways is smaller than the total number of tasks.

Fourth Embodiment

Next, a fourth embodiment according to the present invention will now be described with reference to the drawings.

A processing device according to the present embodiment has the following characteristics (i) to (k).

(i) (i1) The processing device includes a first processor which operates at a first operation speed and a second processor which operates at a second operation speed that is slower than the first operation speed, (i2) the read data selection units include a first read data selection unit that correspond to the first processor and a second read data selection unit that correspond to the second processor, and (i3) the cache memory includes a speed difference adjustment unit that adjust timing at which data outputted from the second read data selection unit is inputted to the second processor, according to a speed difference between the operation speed of the first processor and the operation speed of the second processor.

(j) (j1) The first operation speed is k times the second operation speed, k being a natural number, (j2) an operation clock of the cache memory is the same as an operation clock of the first processor, and (j3) the speed difference adjustment unit includes a delay circuit which delays timing at which data outputted from the second read data selection unit is inputted to the second processor, in terms of the operation clock of the cache memory, by k−1 clocks with respect to the timing at which data outputted from the first read data selection unit is inputted to the first processor.

(k) An instruction set executable by the second processor is the same as an instruction set executable by the first processor.

In light of the above, a description will now be given using as an example a computer system provided with a processing device according to the present embodiment. Note that like structures to those of the third embodiment are assigned like reference characters, and descriptions thereof will be omitted.

First, a configuration of a computer system according to the present embodiment will be described.

Figure 13:
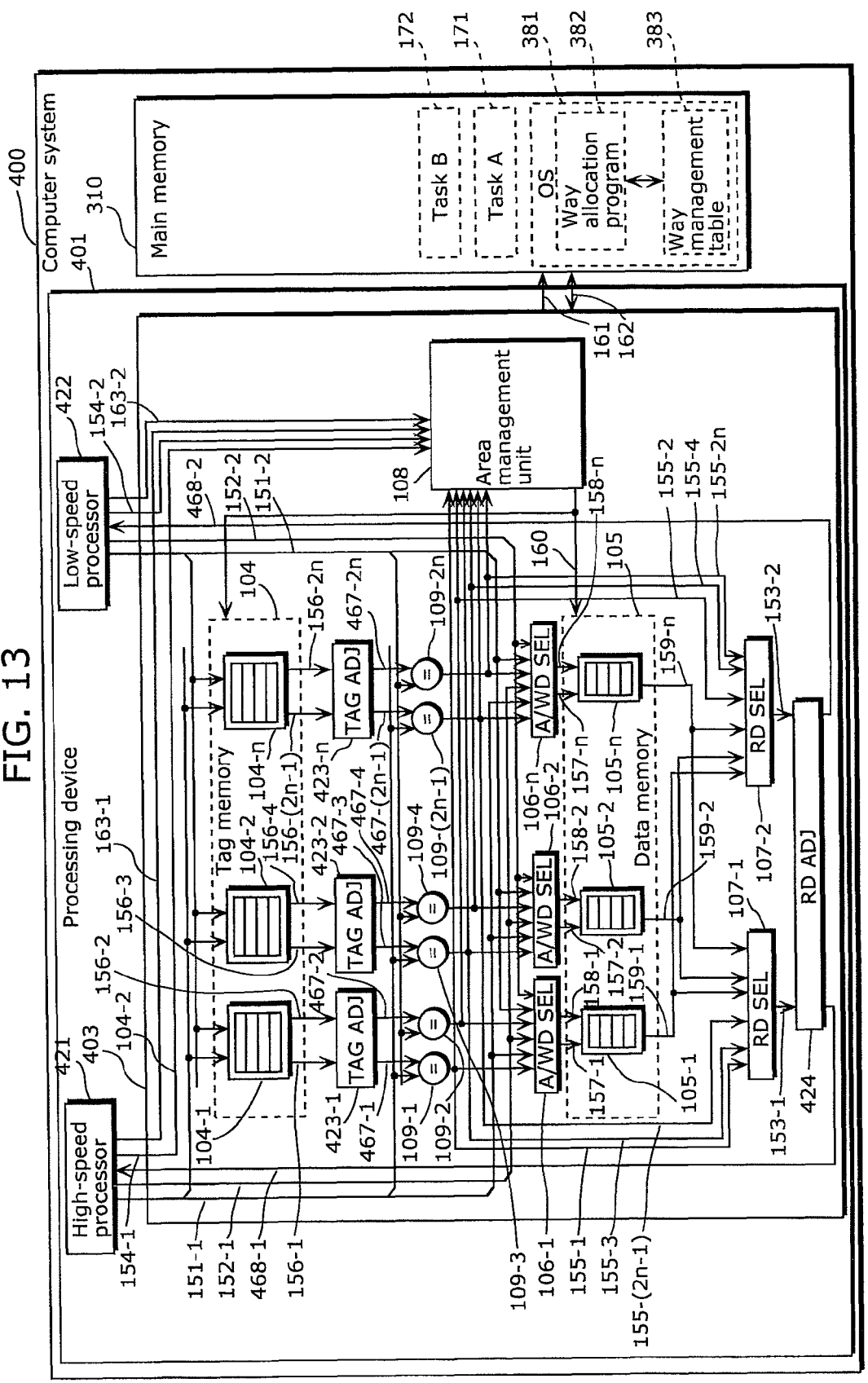
FIG. 13 is a diagram showing a configuration of a computer system according to a fourth embodiment of the present invention.

FIG. 13 is a diagram showing a configuration of a computer system according to the present embodiment. As shown in FIG. 13, in comparison to the computer system 300 according to the third embodiment (for instance, refer to FIG. 10), a computer system 400 includes, instead of the processing device 101, a processing device 401 in which a high-speed processor 421, a low-speed processor 422, a cache memory 403 and the like are included on a single chip.

The high-speed processor 421 creates, in advance, a task such as the tasks A 171 and B 172 under the control of the operating system 381. At this point, a way allocation program 382 is executed. Accordingly, the high-speed processor 421 that is executing the way allocation program 382 references a way management table 383 and determines a way that is allocatable for the created task. Way reserved information that associates the determined way with the created task is generated. The generated way reserved information is then outputted via a signal line 163-1 to the cache memory 403. Way reserved information includes task IDs and way numbers.

Subsequently, when executing a task, the high-speed processor 421 outputs a task ID allocated to the task to be executed via a signal line 154-1 to the cache memory 403. When accessing the cache memory 403 during the execution of a task, a memory access request that includes the access destination address is outputted via a signal line 151-1 to the cache memory 403. At this point, when the purpose of the access request is writing, data is written on the cache memory 403 via a signal line 152-1. When the purpose of the access request is reading, data is read from the cache memory 403 via a signal line 468-1. Note that the number of signal lines corresponding to data transfer size is necessary for the signal lines 152-1 and 468-1.

In addition, the high-speed processor 421 operates at an operation speed that is k times that of the low-speed processor 422. For the present description, k=2 is used as an example.

The low-speed processor 422 is a processor that is limited to operating at an operation speed that is lower than that of the high-speed processor 421. In addition, the low-speed processor 422 is a processor that is reduced in power consumption and area in comparison to the high-speed processor 421. Note that, since the low-speed processor 422 is limited to operations at low speed, it is possible to set the threshold voltage of transistors making up the processor high or to downsize the transistors. It is also possible to reduce the number of stages of buffers. As a result, it is possible to reduce the power consumption and area of the low-speed processor 422 in comparison to the high-speed processor 421.

Furthermore, the low-speed processor 422 is a processor having the same instruction set as the high-speed processor 421.

Note that it is assumed that task creation and way allocation processing performed by the low-speed processor 422 are the same as those performed by the high-speed processor 421, and descriptions thereof will be omitted.

The cache memory 403 is an n-way (where n is a positive integer) set-associative cache memory. In this case, as an example, it is assumed that the cache memory 403 operates at the same speed as the high-speed processor 421. In addition, the cache memory 403 differs from the cache memory 103 in that tag speed difference adjustment units 423-1 to 423-n, a read data speed difference adjustment unit 424 and the like have been newly provided.

Figure 14:
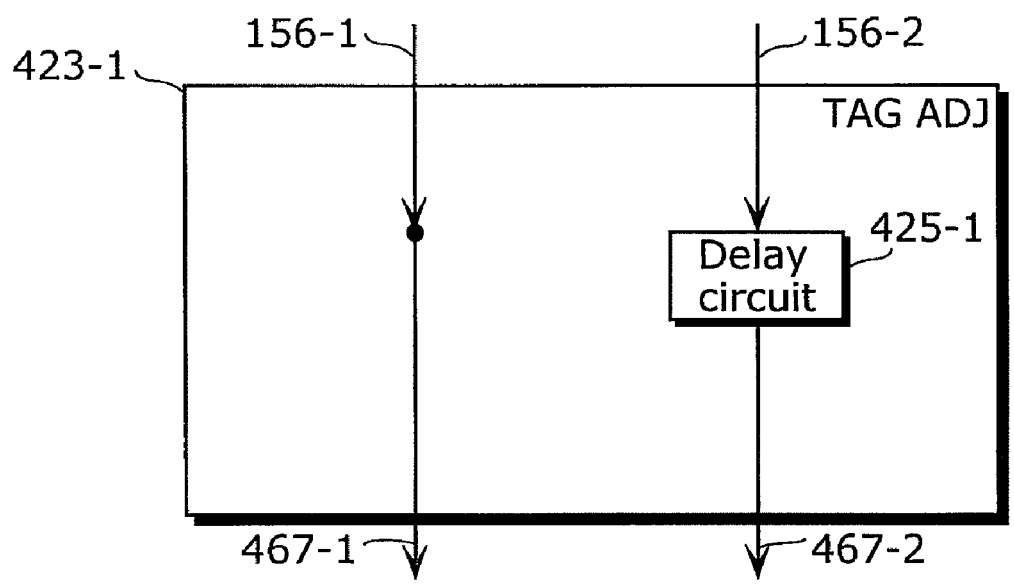
FIG. 14 is a diagram showing a configuration of a tag speed difference adjustment unit according to the fourth embodiment of the present invention.

FIG. 14 is a diagram showing a configuration of a tag speed difference adjustment unit according to the present embodiment. As shown in FIG. 14, the tag speed difference adjustment unit 423-1 is provided with a delay circuit 425-1 and the like.

The tag information for the high-speed processor 421 is inputted to the tag speed difference adjustment unit 423-1 from the tag memory 104-1 via the signal line 156-1. The tag information for the low-speed processor 422 is inputted from the tag memory 104-1 via the signal line 156-2. The tag speed difference adjustment unit 423-1 outputs the tag information for the high-speed processor 421 which is inputted via the signal line 156-1 without modification to the high-speed processor 421 via a signal line 467-1. The tag speed difference adjustment unit 423-1 delays the tag information for the low-speed processor 422 which is inputted via the signal line 156-2 by (k−1) stages at the delay circuit 425-1, and outputs the delayed tag information for the low-speed processor 422 to the low-speed processor 422 via a signal line 467-2.

In this case, since it is assumed that k=2, the tag information for the low-speed processor 422 is delayed at the delay circuit 425-1 by 1 stage.

Note that, since the tag speed difference adjustment units 423-2 to 423-n are similar in configuration to the tag speed difference adjustment unit 423-1, the description thereof will be omitted.

Figure 15:
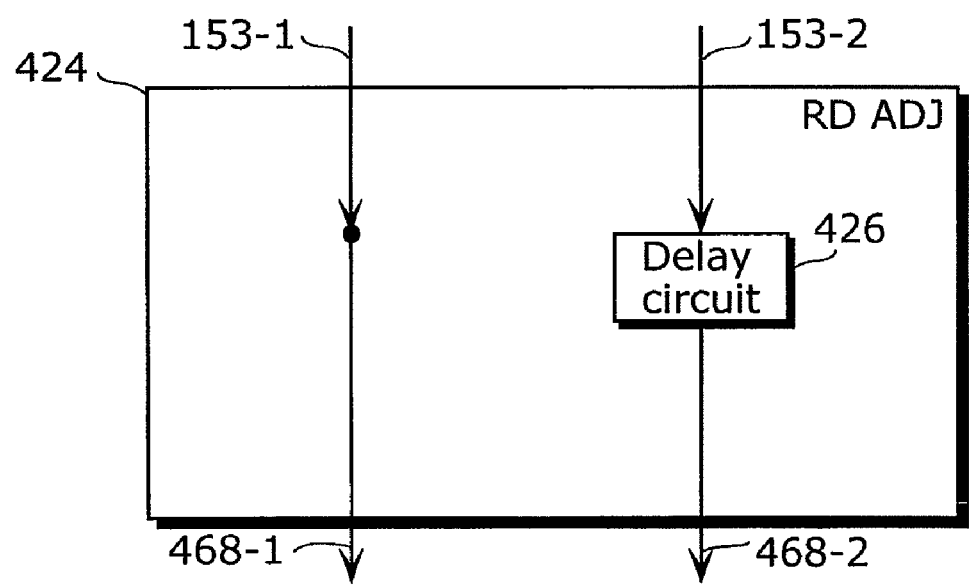
FIG. 15 is a diagram showing a configuration of a read data speed difference adjustment unit according to the fourth embodiment of the present invention.

FIG. 15 is a diagram showing a configuration of a read data speed difference adjustment unit according to the present embodiment. As shown in FIG. 15, a read data speed difference adjustment unit 424 is provided with a delay circuit 426 and the like.

The read data for the high-speed processor 421 is inputted to the read data speed difference adjustment unit 424 from the read data selection unit 107-1 via the signal line 153-1. The read data for the low-speed processor 422 is inputted from the read data selection unit 107-2 via the signal line 153-2.

The read data speed difference adjustment unit 424 outputs the read data for the high-speed processor 421 which is inputted via the signal line 153-1 without modification to the high-speed processor 421 via the signal line 468-1. The read data speed difference adjustment unit 424 delays, by (k−1) stages at the delay circuit 426, the read data for the low-speed processor 422 which is inputted via the signal line 153-2, and outputs the read data of the delayed low-speed processor 422 to the low-speed processor 422 via the signal line 468-2.

In this case, since it is assumed that k=2, the read data for the low-speed processor 422 is delayed at the delay circuit 426 by 1 stage.

Figure 16:
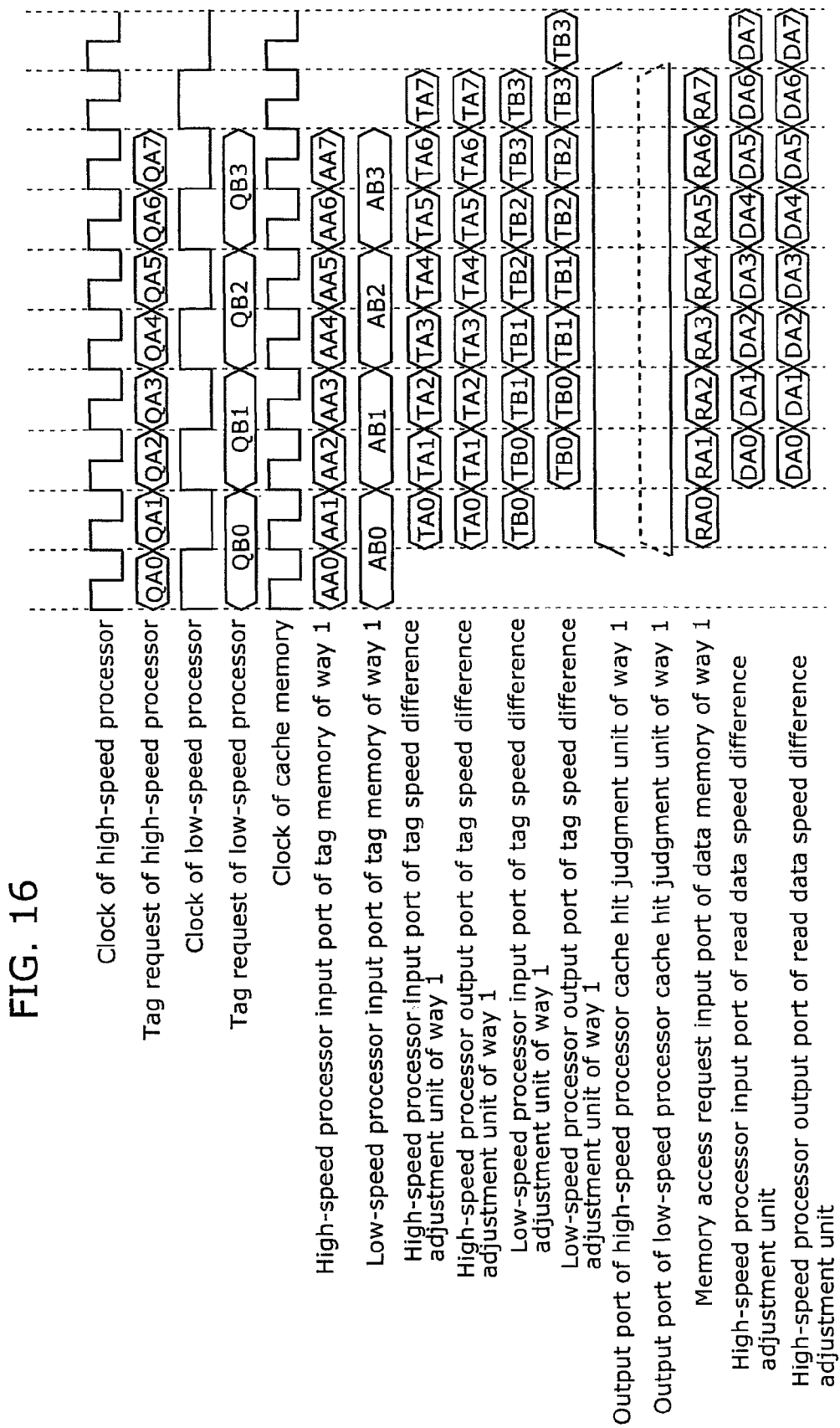
FIG. 16 is a timing chart showing waveforms according to the fourth embodiment of the present invention.
Figure 17:
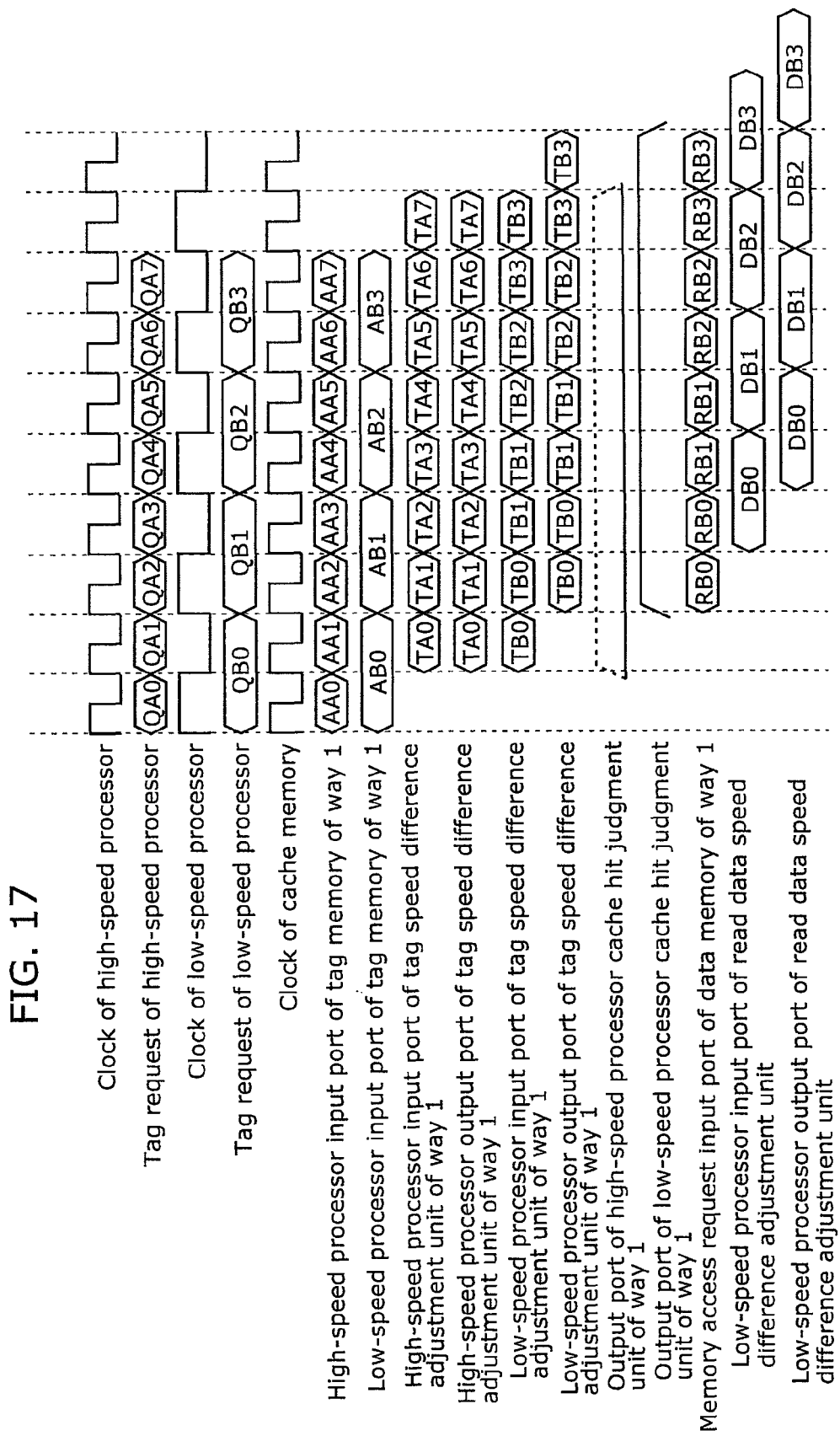
FIG. 17 is a timing chart showing waveforms according to the fourth embodiment of the present invention.

FIGS. 16 and 17 are timing charts showing operation examples according to the present embodiment.

For instance, as shown in FIG. 16, assume that a tag request QA0 and an entry address AA0 have been outputted from the high-speed processor 421 to the cache memory 403 via the signal line 151-1, and that a hit has occurred at the way 1. In this case, a tag TA0 identified by the tag request QA0 and the entry address AA0 is outputted from the tag memory 104-1 corresponding to the way 1. Read data DA0 corresponding to the tag TA0 is outputted from the single-port memory 105-1 corresponding to the way 1. Assume that read data DA0 is outputted from the cache memory 403 to the high-speed processor 421 via the signal line 468-1.

In this case, a period of time equivalent to 1 clock of the clock of the cache memory 403 is required from the input of the entry address AA0 to the tag memory 104-1 to the input of the tag TA0 to the tag speed difference adjustment unit 423-1. This is represented in the drawing by the high-speed processor input port of the tag memory of the way 1 (signal line 151-1) and the high-speed processor input port of the tag speed difference adjustment unit of the way 1 (signal line 156-1).

The tag speed difference adjustment unit 423-1 outputs the tag TA0 inputted from the tag memory 104-1 via the signal line 156-1 without delay and without modification to the cache hit judgment unit 109-1 via the signal line 467-1. As a result, the input of the tag TA0 to the tag speed difference adjustment unit 423-1 to the input of the tag TA0 to the cache hit judgment unit 109-1 are performed within the same clock cycle. This is represented in the drawing by the high-speed processor input port of the tag speed difference adjustment unit of the way 1 (signal line 156-1) and the high-speed processor output port of the tag speed difference adjustment unit of the way 1 (signal line 467-1).

In addition, a period of time equivalent to 1 clock of the clock of the cache memory 403 is required from the input of the memory access request RA0 to the single-port memory 105-1 to the input of the read data DA0 to the read data speed difference adjustment unit 424. This is represented in the drawing by the memory access request input port of the data memory of the way 1 (signal line 157-1) and the high-speed processor input port of the read data speed difference adjustment unit (signal line 153-1).

At this point, the read data speed difference adjustment unit 424 outputs the read data DA0 inputted from the read data selection unit 107-1 via the signal line 153-1 without delay and without modification to the high-speed processor 421 via the signal line 468-1. As a result, the input of the read data DA0 to the read data speed difference adjustment unit 424 to the input of the read data DA0 to the high-speed processor 421 are performed within the same clock cycle. This is represented in the drawing by the high-speed processor input port of the read data speed difference adjustment unit (signal line 153-1) and the high-speed processor output port of the read data speed difference adjustment unit (signal line 468-1).

Subsequently, the high-speed processor 421 outputs the tag request QA0 to the cache memory 403, and after 2 clocks of the clock of the cache memory 403, acquires read data DA0 from the cache memory 403. In this case, 2 clocks of the clock of the cache memory 403 may be converted to 2 cycles of the clock of the high-speed processor 421. Accordingly, the read data corresponding to the data after 2 cycles of the tag request can be acquired.

Note that, since the operations with respect to the tag requests QA1 to QA7 are the same as the operation for the tag request QA0, a description thereof will be omitted.

On the other hand, as shown in FIG. 17, assume that a tag request QB0 and an entry address AB0 have been outputted from the low-speed processor 422 to the cache memory 403 via the signal line 151-2, and that a hit has occurred at the way 1. In this case, a tag TB0 identified by the tag request QB0 and the entry address AB0 is outputted from the tag memory 104-1 corresponding to the way 1. Read data DB0 corresponding to the tag TB0 is outputted from the single-port memory 105-1 corresponding to the way 1. Assume that read data DB0 is outputted from the cache memory 403 to the low-speed processor 422 via the signal line 468-2.

In this case, a period of time equivalent to 1 clock of the clock of the cache memory 403 is required from the input of the entry address AB0 to the tag memory 104-1 to the input of the tag TB0 to the tag speed difference adjustment unit 423-1. This is represented in the drawing by the low-speed processor input port of the tag memory of the way 1 (signal line 151-2) and the low-speed processor input port of the tag speed difference adjustment unit of the way 1 (signal line 156-2).

The tag speed difference adjustment unit 423-1 delays the tag TB0 inputted from the tag memory 104-1 via the signal line 156-2 by 1 stage, and outputs the delayed tag TB0 to the cache hit judgment unit 109-2 via the signal line 467-2. As a result, a period of time equivalent to 1 clock of the clock of the cache memory 403 is required from the input of the tag TB0 to the tag speed difference adjustment unit 423-1 to the input of the tag TB0 to the cache hit judgment unit 109-2. This is represented in the drawing by the low-speed processor input port of the tag speed difference adjustment unit of the way 1 (signal line 156-2) and the low-speed processor output port of the tag speed difference adjustment unit of the way 1 (signal line 467-2).

In addition, a period of time equivalent to 1 clock of the clock of the cache memory 403 is required from the input of the memory access request RB0 to the single-port memory 105-1 to the input of the read data DB0 to the read data speed difference adjustment unit 424. This is represented in the drawing by the memory access request input port of the data memory of the way 1 (signal line 157-1) and the low-speed processor input port of the read data speed difference adjustment unit (signal line 153-2).

At this point, the read data speed difference adjustment unit 424 delays the read data DB0 inputted from the read data selection unit 107-2 via the signal line 153-2 by 1 stage, and outputs the delayed read data DB0 to the low-speed processor 422 via the signal line 468-2. As a result, a period of time equivalent to 1 clock of the clock of the cache memory 403 is required from the input of the read data DB0 to the read data speed difference adjustment unit 424 to the input of the read data DB0 to the low-speed processor 422. This is represented in the drawing by the low-speed processor input port of the read data speed difference adjustment unit (signal line 153-2) and the low-speed processor output port of the read data speed difference adjustment unit (signal line 468-2).

Subsequently, the low-speed processor 422 outputs the tag request QB0 to the cache memory 403, and after 4 clocks of the clock of the cache memory 403, acquires read data DB0. In this case, 4 clocks of the clock of the cache memory 403 may be converted to 2 cycles of the clock of the low-speed processor 422. Accordingly, with the low-speed processor 422, the read data corresponding to the data after 2 cycles of the tag request can be acquired in the same manner as with the high-speed processor 421.

Note that, since the operations with respect to the tag requests QB1 to QB3 are the same as the operation for the tag request QB0, a description thereof will be omitted.

As seen, according to the processing device 401 of the present embodiment, even when a cache memory is shared by processors with different operation speeds, each of the processors is capable of simultaneous access in similar sequences without recognizing the operation speed differences among the processors.

In addition, since operation speed differences can be adjusted, a data output port of a data storage unit need not be provided for each processor, and can instead be shared by processors. As a result, a single-port memory having a smaller cell area as compared to a multiport memory can be used as the data storage unit, thereby improving area reduction of the cache memory as well as cost reduction.

Fifth Embodiment

A fifth embodiment according to the present invention will now be described with reference to the drawings.

A processing device according to the present embodiment has the following characteristic (I).

(I) (I1) The first processor operates at the first operation speed when an operation mode is a first mode, and operates at the second operation speed when the operation mode is a second mode, and (I2) the speed difference adjustment unit adjusts the timing inputted to the second processor during the first mode, and does not adjust the timing inputted to the second processor during the second mode.

In light of the above, a description will now be given using as an example a computer system provided with a processing device according to the present embodiment. Note that like structures to those of the fourth embodiment are assigned like reference characters, and descriptions thereof will be omitted.

First, a configuration of a computer system according to the present embodiment will be described.

Figure 18:
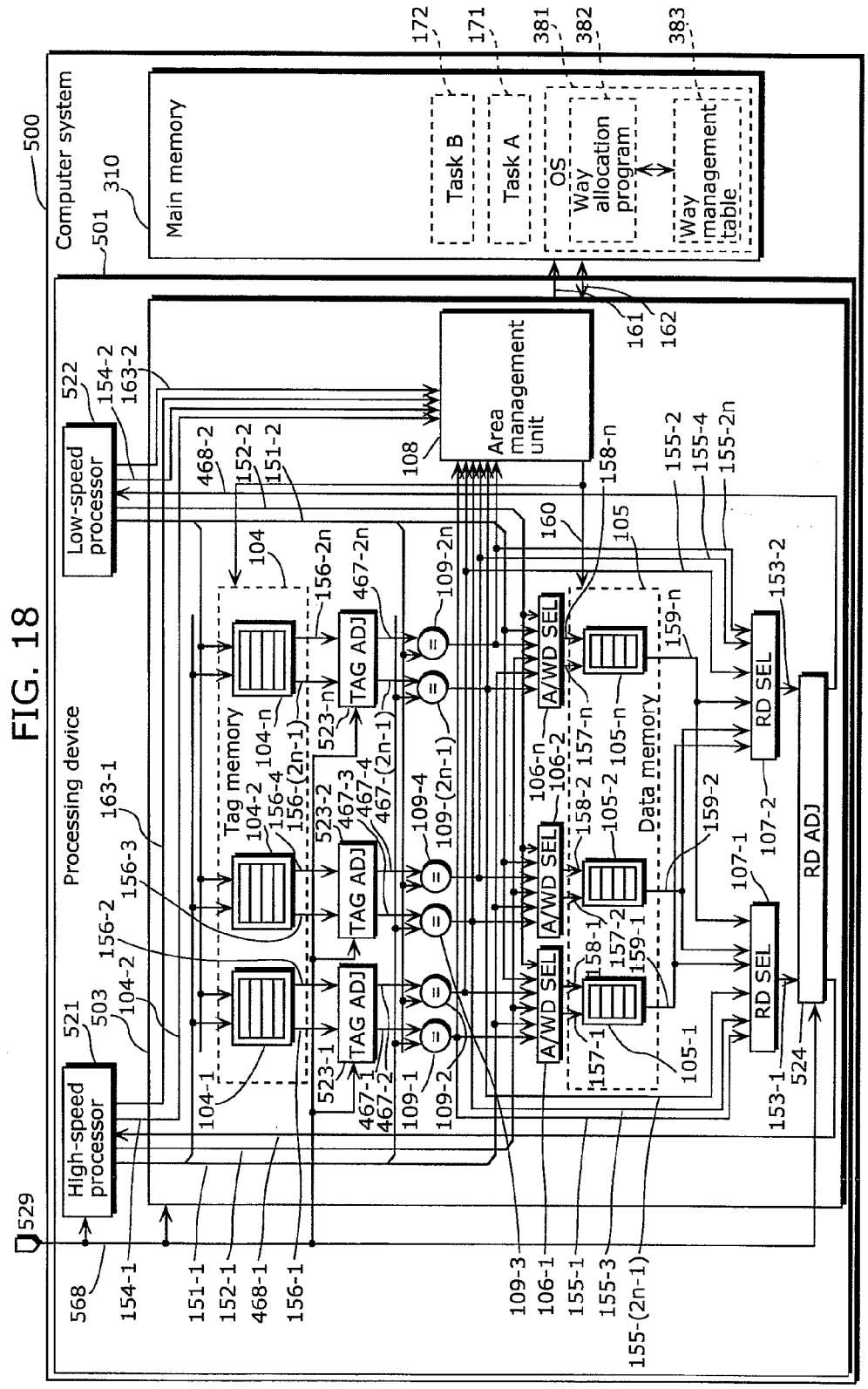
FIG. 18 is a diagram showing a configuration of a computer system according to a fifth embodiment of the present invention.

FIG. 18 is a diagram showing a configuration of a computer system according to the present embodiment. As shown in FIG. 18, in comparison to the computer system 400 according to the fourth embodiment (for instance, refer to FIG. 13), a computer system 500 includes, instead of the processing device 401, a processing device 501 in which a high-speed processor 521, a low-speed processor 522, a cache memory 503 and the like are included on a single chip. The computer system 500 also includes an operation mode terminal 529. In addition, the cache memory 503 differs from the cache memory 403 in that tag speed difference adjustment units 523-1 to 523-$n$ and a read data speed difference adjustment unit 524 are provided instead of the tag speed difference adjustment units 423-1 to 423-$n$ and the read data speed difference adjustment unit 424.

The high-speed processor 521 creates, in advance, a task such as the task A 171 and the task B 172 under the control of the operating system 381. At this point, a way allocation program 382 is executed. Accordingly, the high-speed processor 521 that is executing the way allocation program 382 references a way management table 383 and determines a way that is allocatable for the created task. Way reserved information that associates the determined way with the created task is generated. The generated way reserved information is then outputted via a signal line 163-1 to the cache memory 503. Way reserved information includes task IDs and way numbers.

Subsequently, when executing a task, the high-speed processor 521 outputs a task ID allocated to the task to be executed via a signal line 154-1 to the cache memory 503. When accessing the cache memory 503 during the execution of the task, a memory access request that includes the access destination address is outputted via a signal line 151-1 to the cache memory 503. At this point, when the purpose of the access request is writing, data is written on the cache memory 503 via a signal line 152-1. When the purpose of the access request is reading, data is read from the cache memory 503 via a signal line 468-1. Note that the number of signal lines corresponding to data transfer size is necessary for the signal lines 152-1 and 468-1.

In addition, an operation mode signal is inputted to the high-speed processor 521 from an operation mode terminal 529 via a signal line 568. It is assumed that the high-speed processor 521 operates at an operation speed that is k times that of the low-speed processor 522 when the operation mode signal is mode 1, and operates at the same operation speed as the low-speed processor 522 when the operation mode signal is mode 2. For the present description, k=2 is used as an example.

The low-speed processor 522 is a processor having a maximum operation speed that is slower than that of the high-speed processor 521. In addition, the low-speed processor 522 is a processor that is reduced in power consumption and area in comparison to the high-speed processor 521. Note that, since the low-speed processor 522 is limited to operations at low speed, it is possible to set the threshold voltage of transistors making up the processor high or to downsize the transistors. It is also possible to reduce the number of stages of buffers. As a result, it is possible to reduce the power consumption and area of the low-speed processor 522 in comparison to the high-speed processor 521.

Furthermore, the low-speed processor 522 is a processor having the same instruction set as the high-speed processor 521.

Note that it is assumed that task creation and way allocation processing performed by the low-speed processor 522 are the same as those performed by the high-speed processor 521, and descriptions thereof will be omitted.

Note that it is also assumed that an instruction set executable by the low-speed processor 522 is the same as an instruction set executable by the high-speed processor 521.

The cache memory 503 is an n-way (where n is a positive integer) set-associative cache memory. In this case, as an example, it is assumed that an operation mode signal is inputted to the cache memory 503 from the operation mode terminal 529 via the signal line 568, whereby the cache memory 503 operates at the same speed as the high-speed processor 521 according to the inputted operation mode signal. In addition, the cache memory 503 differs from the cache memory 403 in that tag speed difference adjustment units 523-1 to 523-$n$ and a read data speed difference adjustment unit 524 are provided instead of the tag speed difference adjustment units 423-1 to 423-$n$ and the read data speed difference adjustment unit 424.

Figure 19:
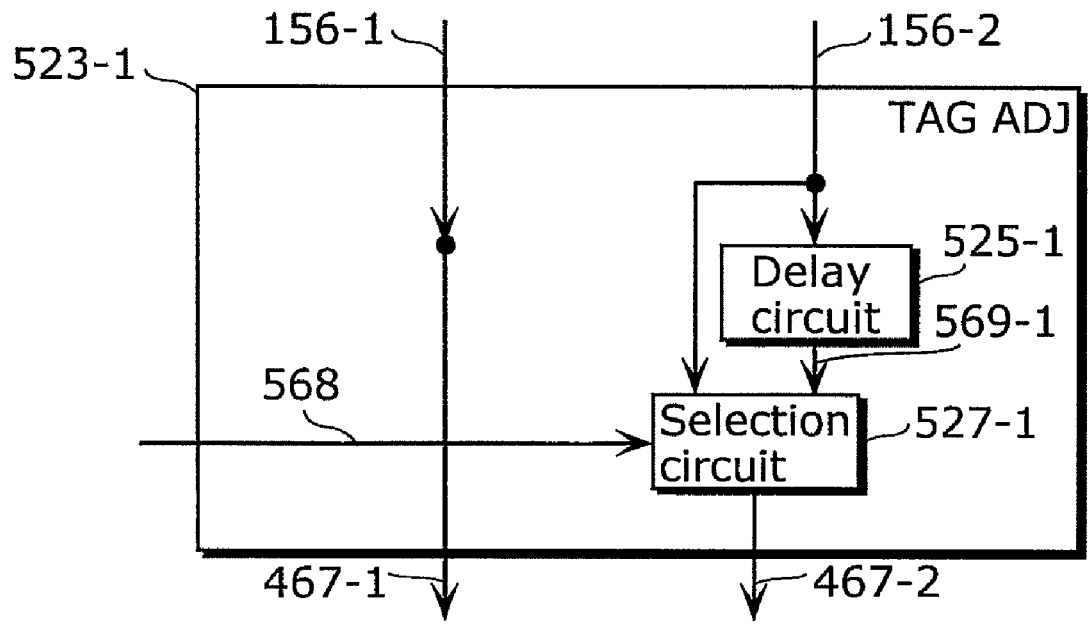
FIG. 19 is a diagram showing a configuration of a tag speed difference adjustment unit according to the fifth embodiment of the present invention.

FIG. 19 is a diagram showing a configuration of a tag speed difference adjustment unit according to the present embodiment. As shown in FIG. 19, the tag speed difference adjustment unit 523-1 is provided with a delay circuit 525-1, a selection circuit 527-1 and the like.

The tag information for the high-speed processor 521 is inputted to the tag speed difference adjustment unit 523-1 from the tag memory 104-1 via the signal line 156-1. The tag information for the low-speed processor 522 is inputted from the tag memory 104-1 via the signal line 156-2. An operation mode signal is inputted from the operation mode terminal 529 via the signal line 568.

The tag speed difference adjustment unit 523-1 outputs the tag information for the high-speed processor 521 which is inputted via the signal line 156-1 without modification to the high-speed processor 521 via the signal line 467-1.

In addition, when the operation mode signal is mode 1, the selection circuit 527-1 in the tag speed difference adjustment unit 523-1 selects a signal line 569-1 as an input source, and the tag information for the low-speed processor 522 which has been inputted via the selected input source, in other words, the tag information for the low-speed processor 522 that has been delayed by (k−1) stages at the delay circuit 525-1 is outputted to the low-speed processor 522 via the signal line 467-2.

In this case, since it is assumed that k=2, the tag information for the low-speed processor 522 is delayed at the delay circuit 525-1 by 1 stage.

Furthermore, when the operation mode signal is mode 2, the selection circuit 527-1 in the tag speed difference adjustment unit 523-1 selects a signal line 156-2 as an input source, and the tag information for the low-speed processor 522 which has been inputted via the selected input source is outputted to the low-speed processor 522 via the signal line 467-2.

Note that, since the tag speed difference adjustment units 523-2 to 523-n are similar in configuration to the tag speed difference adjustment unit 523-1, a description thereof will be omitted.

Figure 20:
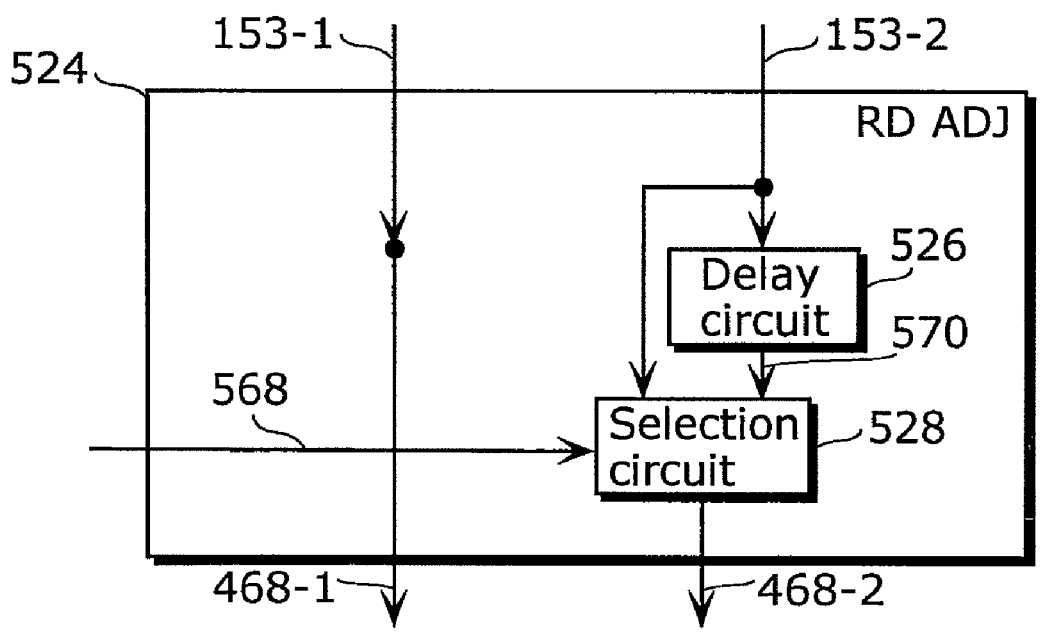
FIG. 20 is a diagram showing a configuration of a read data speed difference adjustment unit according to the fifth embodiment of the present invention.

FIG. 20 is a diagram showing a configuration of a read data speed difference adjustment unit according to the present embodiment. As shown in FIG. 20, the read data speed difference adjustment unit 524 is provided with a delay circuit 526, a selection circuit 528 and the like.

The read data for the high-speed processor 521 is inputted to the read data speed difference adjustment unit 524 from the read data selection unit 107-1 via the signal line 153-1. The read data for the low-speed processor 522 is inputted from the read data selection unit 107-2 via the signal line 153-2. An operation mode signal is inputted from the operation mode terminal 529 via the signal line 568.

The read data speed difference adjustment unit 524 outputs the read data for the high-speed processor 521 which is inputted via the signal line 153-1 without modification to the high-speed processor 521 via the signal line 468-1.

In addition, when the operation mode signal is mode 1, the selection circuit 528 in the read data speed difference adjustment unit 524 selects a signal line 570 as an input source, and the read data for the low-speed processor 522 which has been inputted via the selected input source, in other words, the read data for the low-speed processor 522 that has been delayed by (k−1) stages at the delay circuit 526 is outputted to the low-speed processor 522 via the signal line 468-2.

In this case, since it is assumed that k=2, the read data for the low-speed processor 522 is delayed at the delay circuit 526 by 1 stage.

Furthermore, when the operation mode signal is mode 2, the selection circuit 528 in the read data speed difference adjustment unit 524 selects a signal line 153-2 as an input source, and the read data for the low-speed processor 522 which has been inputted via the selected input source is outputted to the low-speed processor 522 via the signal line 468-2.

Figure 21:
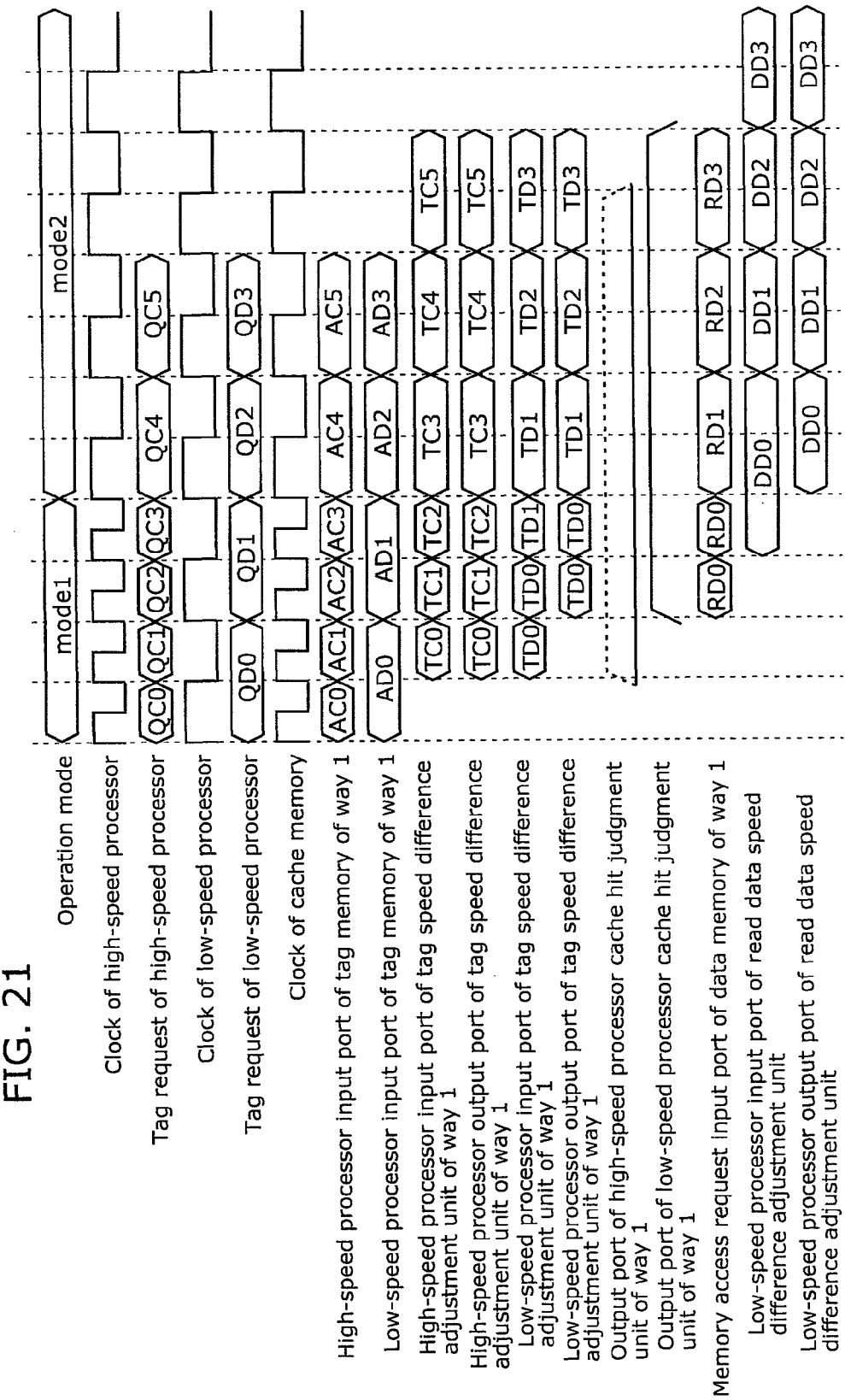
FIG. 21 is a timing chart showing waveforms according to the fifth embodiment of the present invention.

FIG. 21 is a timing chart showing operation examples according to the present embodiment. First, as shown in FIG. 21, operations performed when the operation mode is mode 1 will be described. In this case, for example, it is assumed that a tag request QD0 and an entry address AD0 have been outputted from the low-speed processor 522 to the cache memory 503 via the signal line 151-2, and that a hit has occurred at the way 1. Accordingly, a tag TD0 identified by the tag request QD0 and the entry address AD0 is outputted from the tag memory 104-1 corresponding to the way 1. Read data DD0 corresponding to the tag TD0 is outputted from the single-port memory 105-1 corresponding to the way 1. Assume that read data DD0 is outputted from the cache memory 503 to the low-speed processor 522 via the signal line 468-2.

In this case, a period of time equivalent to 1 clock of the clock of the cache memory 503 is required from the input of the entry address AD0 to the tag memory 104-1 to the input of the tag TD0 to the tag speed difference adjustment unit 523-1. This is represented in the drawing by the low-speed processor input port of the tag memory of the way 1 (signal line 151-2) and the low-speed processor input port of the tag speed difference adjustment unit of the way 1 (signal line 156-2).

The selection circuit 527-1 in the tag speed difference adjustment unit 523-1 selects a signal line 569-2 as an input source, and the tag TD0 which has been delayed by 1 stage at the delay circuit 525-1 is outputted to the cache hit judgment unit 109-2 via the signal line 467-2. As a result, a period of time equivalent to 1 clock of the clock of the cache memory 503 is required from the input of the tag TD0 to the tag speed difference adjustment unit 523-1 to the input of the tag TD0 to the cache hit judgment unit 109-2. This is represented in the drawing by the low-speed processor input port of the tag speed difference adjustment unit of the way 1 (signal line 156-2) and the low-speed processor output port of the tag speed difference adjustment unit of the way 1 (signal line 467-2).

In addition, a period of time equivalent to 1 clock of the clock of the cache memory 503 is required from the input of the memory access request RD0 to the single-port memory 105-1 to the input of the read data DD0 to the read data speed difference adjustment unit 524. This is represented in the drawing by the memory access request input port of the data memory of the way 1 (signal line 157-1) and the low-speed processor input port of the read data speed difference adjustment unit (signal line 153-2).

The selection circuit 528 in the read data speed difference adjustment unit 524 selects a signal line 570 as an input source, and the read data DD0 for the low-speed processor 522 which has been delayed by 1 stage at the delay circuit 526 is outputted to the low-speed processor 522 via the signal line 468-2. As a result, a period of time equivalent to 1 clock of the clock of the cache memory 503 is required from the input of the read data DD0 to the read data speed difference adjustment unit 524 to the input of the read data DD0 to the low-speed processor 522. This is represented in the drawing by the low-speed processor input port of the read data speed difference adjustment unit (signal line 153-2) and the low-speed processor output port of the read data speed difference adjustment unit (signal line 468-2).

Next, operations performed when the operation mode is mode 2 will be described. In this case, for example, it is assumed that a tag request QD2 and an entry address AD2 have been outputted from the low-speed processor 522 to the cache memory 503 via the signal line 151-2, and that a hit has occurred at the way 1. Accordingly, a tag TD2 identified by the tag request QD2 and the entry address AD2 is outputted from the tag memory 104-1 corresponding to the way 1. Read data DD2 corresponding to the tag TD2 is outputted from the single-port memory 105-1 corresponding to the way 1. Assume that read data DD2 is outputted from the cache memory 503 to the low-speed processor 522 via the signal line 468-2.

In this case, a period of time equivalent to 1 clock of the clock of the cache memory 503 is required from the input of the entry address AD2 to the tag memory 104-1 to the input of the tag TD2 to the tag speed difference adjustment unit 523-1. This is represented in the drawing by the low-speed processor input port of the tag memory of the way 1 (signal line 151-2) and the low-speed processor input port of the tag speed difference adjustment unit of the way 1 (signal line 156-2).

The tag speed difference adjustment unit 523-1 outputs the tag TD2, for which the signal line 156-2 has been selected by the selection circuit 527-1 as an input source, without delay and without modification to the cache hit judgment unit 109-2 via the signal line 467-2. As a result, the input of the tag TD2 to the tag speed difference adjustment unit 523-1 to the input of the tag TD2 to the cache hit judgment unit 109-2 are performed within the same clock cycle. This is represented in the drawing by the low-speed processor input port of the tag speed difference adjustment unit of the way 1 (signal line 156-2) and the low-speed processor output port of the tag speed difference adjustment unit of the way 1 (signal line 467-2).

In addition, a period of time equivalent to 1 clock of the clock of the cache memory 503 is required from the input of the memory access request RD2 to the single-port memory 105-1 to the input of the read data DD2 to the read data speed difference adjustment unit 524. However, the time required under mode 2 is twice that of mode 1. This is represented in the drawing by the memory access request input port of the data memory of the way 1 (signal line 157-1) and the low-speed processor input port of the read data speed difference adjustment unit (signal line 153-2).

The selection circuit 528 in the read data speed difference adjustment unit 524 selects a signal line 153-2 as an input source, and the read data DD2 for the low-speed processor 522 is outputted to the low-speed processor 522 via the signal line 468-2 without delay and without modification. As a result, the input of the read data DD2 to the read data speed difference adjustment unit 524 to the input of the read data DD2 to the low-speed processor 522 are performed within the same clock cycle. This is represented in the drawing by the low-speed processor input port of the read data speed difference adjustment unit (signal line 153-2) and the low-speed processor output port of the read data speed difference adjustment unit (signal line 468-2).

During mode 2, the high-speed processor 521 requires twice as much time as during mode 1 for acquiring read data. However, in the same manner as during mode 1, the read data corresponding to the data after 2 cycles of the tag request can be acquired.

Conversely, during mode 2, the low-speed processor 522 requires the same amount of time as during mode 1 for acquiring read data. Therefore, in the same manner as during mode 1, the read data corresponding to the data after 2 cycles of the tag request can be acquired.

Note that the selection circuit 527-1 of the tag speed difference adjustment unit 523-1 and the selection circuit 528 of the read data speed difference adjustment unit 524 may be arranged to be switched by operation signals at timings before or after the switching of operation modes. This will enable continuous cache memory access.

As seen, according to the processing device 501 of the present embodiment, even when a cache memory is shared by processors with different operation speeds, each of the processors is capable of simultaneous access in similar sequences without recognizing the operation speed differences among the processors as well as the switching timing of operation speeds.

In addition, since operation speed differences can be adjusted, a data output port of a data storage unit need not be provided for each processor, and can instead be shared by processors. As a result, a single-port memory having a smaller cell area as compared to a multiport memory can be used as the data storage unit, thereby improving area reduction of the cache memory as well as cost reduction.

Furthermore, in the present embodiment, for operations in the case where a hit occurs at the high-speed processor 521, the high-speed processor 521 and the cache memory 503 operate at the same speed regardless of switching of operation modes and accessing in the same sequence is now possible. Accordingly, descriptions thereof will be omitted.

Compared to the fourth embodiment, more selections with respect to processing performance and power consumption is now possible through combinations of processors to be operated and operation modes. As a result, a computer system provided with processing performance and power consumption that are appropriate for various processing can be achieved.

Sixth Embodiment

Next, a sixth embodiment according to the present invention will now be described with reference to the drawings.

It should be noted that, for the present embodiment, a mobile apparatus including a computer system according to any of the first to fifth embodiments will be described.

A mobile apparatus according to the present embodiment has the following characteristic (m).

(m) A mobile apparatus includes: (m1) one of the processing devices described in the first to fifth embodiments; (m2) a main storage device which stores an audio decoding program that decodes audio data and an image decoding program that decodes image data; (m3) an audio output device that output audio based on an audio decoding result; and (m4) an image output device that output an image based on an image decoding result, (m5) wherein among the processors, the processor having executed the image decoding program outputs, to the image output device, the image decoding result obtained by decoding the image data, and (m6) among the processors, the processor having executed the audio decoding program outputs, to the audio output device, the audio decoding result obtained by decoding the audio data.

In light of the above, a mobile apparatus according to the present embodiment will now be described. Note that, for the present description, a mobile apparatus having the computer system 100 according to the first embodiment will be described as an example.

Figure 22:
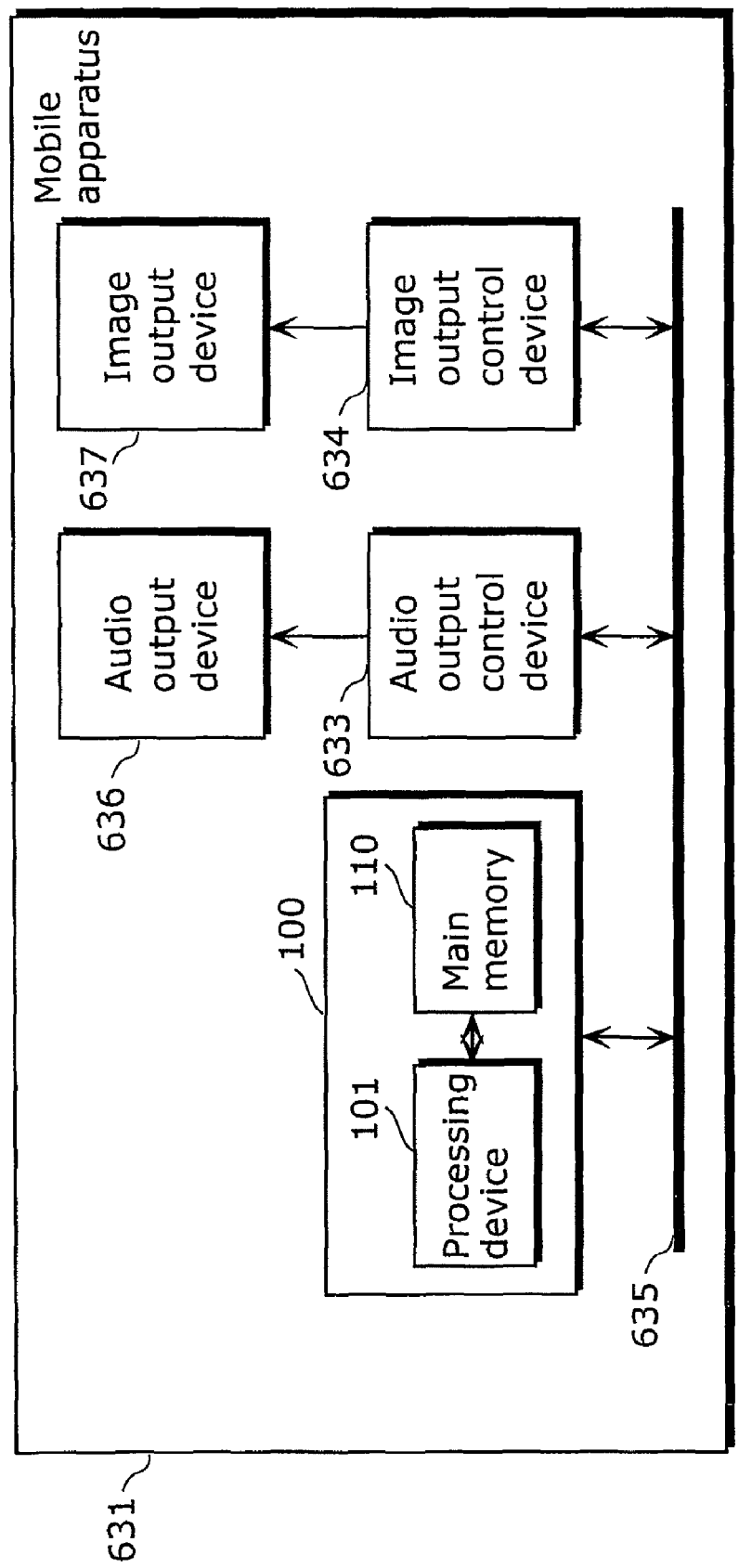
FIG. 22 is a diagram showing a configuration of a mobile apparatus according to a sixth embodiment of the present invention.

FIG. 22 is a diagram showing a configuration of a mobile apparatus according to the present embodiment. As shown in FIG. 22, a mobile apparatus 631 includes the computer system 100, an audio output control device 633, an image output control device 634, a data bus 635, an audio output device 636, an image output device 637, and the like.

As an example, it is assumed that a task A 171 is a task (program) for decoding audio data. In addition, it is assumed that a task B 172 is a task (program) for decoding image data.

A processing device 101 parallelly executes the task A 171 and the task B 172. For example, the task A 171 is executed by a processor 102-2. The task B 172 is executed by a processor 102-1. Accordingly, audio decoding results obtained by decoding audio data is outputted to the audio output control device 633 via the data bus 635. In addition, image decoding results obtained by decoding image data is outputted to the image output control device 634 via the data bus 635.

Note that each processor is not limited to the execution of either the image decoding program or the audio decoding program.

The audio output control device 633 receives audio decoding results inputted via the data bus 635 from the processing device 101, and sequentially transfers the received audio decoding results to the audio output device 636.

The image output control device 634 receives image decoding results inputted via the data bus 635 from the processing device 101, and sequentially transfers the received image decoding results to the image output device 637.

The audio output device 636 outputs audio based on the audio decoding results sequentially transferred from the audio output control device 633.

The image output device 637 outputs images based on the image decoding results sequentially transferred from the image output control device 634.

Generally, since the mobile apparatus 631 will primarily operate on a battery, reduced power consumption is desired. On the other hand, a high processing performance is required for simultaneous playback of moving images and audio. Therefore, a processing device is required which is capable of responding to both low power consumption under low loads and high performance under high loads. In this light, by applying the processing device 101 of the computer system 100 according to the first embodiment, the number of processors in operation can be changed according to the volume of program processing (the number of tasks), thereby achieving a mobile apparatus that realizes both low power consumption and high performance. In addition, downsizing of the mobile apparatus is now possible using a processing device provided with processors yet reduced in area. Furthermore, since access conflicts to the same data storage unit can be avoided, the improvement of the processing performance of the mobile apparatus may be promoted.

(Variation)

It should be noted that a processing device according to the present invention may be arranged such that the processing device and a main memory is included into a single chip.

Note that a processing device according to the present invention may be realized by an LSI in which the respective functions of the processing device are embedded.

Note that, the LSI may be configured as a full-custom LSI, a semi-custom LSI such as an ASIC (Application Specific Integrated Circuit), a programmable logic device such as an FPGA or an CPLD, or a dynamic reconfigurable device having a dynamically rewritable circuit configuration.

In addition, design data that configures the respective functions of the processing device into an LSI may be a program written in hardware description language (hereinafter referred to as an HDL program). Furthermore, the design data may be a gate level net list obtained by performing logic synthesis on the HDL program. Moreover, the design data may be macrocell information in which placement information, process conditions and the like are added to the gate level net list. Moreover, the design data may be mask data that defines dimensions, timings and the like. Examples of hardware description language include VHDL (Very high speed integrated circuit Hardware Description Language), Verilog-HDL and SystemC.

Furthermore, the design data may be arranged to be recorded on a recording medium readable by a hardware system such as a general computer system or an embedded system. Moreover, the design data may be arranged to be executed when read by another hardware system via the recording medium. Moreover, the design data that is read by another hardware system via the recording medium may be arranged to be downloaded by a programmable logic device via a download cable. Examples of recording media readable by a general computer system include optical recording media (such as a CD-ROM), magnetic recording media (such as a hard disk), magneto-optical recording medium (such as an MO), and semiconductor memories (such as a memory card).

Alternatively, the design data may be arranged to be held on a hardware system that is connected to a network such as the Internet or a local area network. Moreover, the design data may be arranged to be executed when downloaded by another hardware system via the network. Moreover, the design data that is acquired by another hardware system via the network may be arranged to be downloaded to a programmable logic device via a download cable. Examples of networks include a terrestrial broadcasting network, a satellite broadcasting network, a PLC (Power Line Communication), a mobile telephone network, a wire communication network (such as IEEE802.3), and a wireless communication network (such as IEEE802.11).

Alternatively, the design data may be arranged to be recorded in advance on a serial ROM to allow transfer to an FPGA upon turn-on. In addition, the design data recorded on the serial ROM may be arranged to be directly downloaded by the FPGA upon turn-on.

Alternatively, the design data may be arranged to be generated by a microprocessor upon turn-on and subsequently downloaded by the FPGA.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be used as, for example, a computer system having a cache memory that is shared by processors.

What is claimed is:

1. A processing device included on a single chip, comprising:
    processors that execute tasks in parallel; and
    a cache memory shared by said processors,
    wherein said cache memory includes tag storages, data storages and read data selectors,
    each of said tag storages is a multi-port memory having multiple data output ports that are independently accessible,
    each of said data storages is a single-port memory having one data output port that is independently accessible,
    each of the multiple data output ports of said tag storages being in a one-to-one association with said processors, and
    each of said read data selectors is in a one-to-one association with a corresponding one of said processors, and selects, from among said data storages, a data storage which stores data to be read by an associated processor according to an output of a corresponding one of said tag storages.

2. The processing device according to claim 1,
    wherein each of said data storages has one memory access request input port and one data input port,
    said cache memory includes memory access request selectors , and
    each of said memory access request selectors is in a one-to-one association with each of said data storages and selects a memory access request outputted from a processor of said processors which executes a task that is allocated to an associated data storage, from among memory access requests individually outputted from said processors.

3. The processing device according to claim 1,
    wherein each of said data storages is classified into one of a plurality of data storage areas, each of said data storage areas being made up of at least one of said data storages , and
    said cache memory includes:
    an allocation information holder that holds allocation information indicating that a predetermined task has been allocated to a predetermined data storage area from among said data storage areas, in association with the predetermined data storage area; and
    an identifier that identifies, when a refill occurs for the predetermined task, the predetermined data storage area from among said data storage areas as a refillable data storage area, based on the allocation information held in said allocation information holder.

4. The processing device according to claim 1,
wherein said cache memory is an n-way set-associative cache memory, n being a natural number, and
each of said data storages is in a one-to-one association with each of the n-ways.

5. A computer system, comprising:
said processing device according to claim 3; and
a main storage which stores an allocation program,
wherein when the predetermined task is allocated, said processor allocates the predetermined data storage area for the predetermined task from among said data storage areas, and to register the allocation information in said allocation information holder in association with the predetermined data storage area, said processing device having executed the allocation program.

6. The computer system according to claim 5,
wherein said processing device manages the allocation of tasks to each of said data storage areas to allocate a different data storage area from among said data storage areas for each task, and to register different allocation information for each task in said allocation information holder in association with a different data storage area for each task, said processing device having executed the allocation program.

7. The computer system according to claim 5,
wherein said processing device classifies each of said data storage areas into a cache area of a plurality of cache areas that are respectively in a one-to-one association with each of said processors, to manage the allocation of tasks to each of said data storage areas, to allocate a data storage area within a predetermined cache area, in association with a predetermined processor, from among the cache areas, for a task that is executed by said predetermined processor, said predetermined processor being from among said processors, and to register a plurality of allocation information that individually identifies tasks to be executed by said predetermined processor, in said allocation information holder in association with the predetermined cache area, said processing device having executed the allocation program.

8. The computer system according to claim 7,
wherein said processing device classifies each of said data storage areas that make up the predetermined cache area into either a first partial cache area made up of data storage areas that are allocatable only to a first task or a second partial cache area made up of data storage areas that are allocatable for a plurality of tasks, and when a task executed by said predetermined processor is of a predetermined type, a data storage area is allocated from the first partial cache area, and when the task executed by said predetermined processor is not of the predetermined type, a data storage area is allocated from the second partial cache area, said processing device having executed the allocation program.

9. The processing device according to claim 1,
wherein said processors include a first processor which operates at a first operation speed and a second processor which operates at a second operation speed that is slower than the first operation speed,
said read data selectors include a first read data selector that corresponds to said first processor and a second read data selector that corresponds to said second processor, and
said cache memory includes a speed difference adjuster that adjusts a timing at which data outputted from said second read data selector is inputted to said second processor, according to a speed difference between the first operation speed of said first processor and the second operation speed of said second processor.

10. The processing device according to claim 9,
wherein the first operation speed is k times the second operation speed, k being a natural number,
an operation clock of said cache memory is the same as an operation clock of said first processor, and
said speed difference adjuster includes a delay circuit which delays timing at which data outputted from said second read data selector is inputted to said second processor, in terms of the operation clock of said cache memory, by k−1 clocks with respect to a timing at which data outputted from said first read data selector is inputted to said first processor.

11. The processing device according to claim 9,
wherein an instruction set executable by said second processor is the same as an instruction set executable by said first processor.

12. The processing device according to claim 9,
wherein said first processor operates at the first operation speed when an operation mode is a first mode, and operates at the second operation speed when the operation mode is a second mode, and
said speed difference adjuster adjusts the timing inputted to said second processor when operating in the first mode, and does not adjust the timing inputted to said second processor when operating in the second mode.

13. A mobile apparatus, comprising:
processing device according to claim 1;
a main storage which stores an audio decoding program that decodes audio data and an image decoding program that decodes image data;
an audio outputter that outputs audio based on an audio decoding result; and
an image outputter that outputs an image based on an image decoding result,
wherein among said processors, a processor having executed the image decoding program outputs, to said image outputter, the image decoding result obtained by decoding the image data, and
among said processors, another processor having executed the audio decoding program outputs, to said audio outputter, the audio decoding result obtained by decoding the audio data.

14. A control method for controlling a processing device in which processors capable of executing tasks in parallel and a cache memory shared by the processors are included on a single chip, comprising:
allocating, when a predetermined task is created, a predetermined data storage area from among data storage areas to the cache memory for the predetermined task, according to outputs of tag storages included in the cache memory, and
selecting, from among the data storage areas, a data storage area which stores data to be read by a predetermined processor that is executing the predetermined task from among the processors,
wherein each of the tag storages includes a multi-port memory having multiple data output ports that are independently accessible, and
each of said data storage areas includes a single-port memory having one data output port that is independently accessible.

* * * * *